(12) United States Patent
Kelchner et al.

(10) Patent No.: US 10,057,468 B2
(45) Date of Patent: *Aug. 21, 2018

(54) AERO-WAVE INSTRUMENT FOR THE MEASUREMENT OF THE OPTICAL WAVE-FRONT DISTURBANCES IN THE AIRFLOW AROUND AIRBORNE SYSTEMS

(71) Applicant: THE BOEING COMPANY, Chicago, IL (US)

(72) Inventors: Bryan Lee Kelchner, Albuquerque, NM (US); Kenneth Jerkatis, Albuquerque, NM (US); Richard Brooks Holmes, Albuquerque, NM (US); Nikolaus McNerney, Albuquerque, NM (US); Jed Donaldson, Albuquerque, NM (US)

(73) Assignee: THE BOEING COMPANY, Chicago, IL (US)

( * ) Notice: Subject to any disclaimer, the term of this patent is extended or adjusted under 35 U.S.C. 154(b) by 858 days.

This patent is subject to a terminal disclaimer.

(21) Appl. No.: 14/501,854

(22) Filed: Sep. 30, 2014

(65) Prior Publication Data

US 2016/0255253 A1    Sep. 1, 2016

(51) Int. Cl.
*G02B 26/08*    (2006.01)
*H04N 5/225*    (2006.01)
(Continued)

(52) U.S. Cl.
CPC ............. *H04N 5/2254* (2013.01); *F41G 3/22* (2013.01); *G01S 3/786* (2013.01); *G01S 7/497* (2013.01);
(Continued)

(58) Field of Classification Search
CPC .. G02B 26/08; G02B 26/0816; G02B 7/1821; G02B 17/0605; G02B 17/061;
(Continued)

(56) References Cited

U.S. PATENT DOCUMENTS 4,061,996 A    12/1977 Gupta et al.
4,443,103 A    4/1984 Erdmann et al.
(Continued)

OTHER PUBLICATIONS

European Search Report for European Application No. EP 15 18 4901 dated Jan. 20, 2016.
(Continued)

*Primary Examiner* — James Phan
(74) *Attorney, Agent, or Firm* — Marshall, Gerstein & Borun LLP

(57) ABSTRACT

An aero-optical disturbance measurement system includes a mirror supported by a gimbal for receiving a light beam from a light emitting source, reflecting the light beam to a first periscope fold mirror and therefrom reflecting the light beam directly to a second periscope fold mirror. A first concave off-axis paraboloid mirror receives the light beam reflected from second periscope fold mirror and therefrom a first fold mirror receives the light beam reflected directly from first concave off-axis paraboloid mirror. A second fold mirror receives the light beam reflected directly from the first fold mirror. A second concave off-axis paraboloid mirror receives the light beam reflected directly from second fold mirror which reflects the light beam to a fast steering mirror. A fine tracker camera coupled to an embedded processer receives portion of light beam from fast steering mirror. Embedded processor controls movement of fast steering mirror and gimbal.

64 Claims, 9 Drawing Sheets

(51) Int. Cl.
*F41G 3/22* (2006.01)
*H04B 10/112* (2013.01)
*G02B 7/182* (2006.01)
*G02B 17/06* (2006.01)
*G02B 23/08* (2006.01)
*G01S 3/786* (2006.01)
*G01S 7/497* (2006.01)
*G01S 17/58* (2006.01)
*G01S 17/95* (2006.01)
*G02B 26/00* (2006.01)
*G02B 27/14* (2006.01)
*G01S 17/66* (2006.01)
*G01J 9/00* (2006.01)

(52) U.S. Cl.
CPC ....... *G02B 7/1821* (2013.01); *G02B 17/0605* (2013.01); *G02B 23/08* (2013.01); *G02B 26/0816* (2013.01); *H04B 10/1125* (2013.01); *G01J 2009/002* (2013.01); *G01S 17/58* (2013.01); *G01S 17/66* (2013.01); *G01S 17/95* (2013.01); *G02B 26/008* (2013.01); *G02B 27/14* (2013.01)

(58) Field of Classification Search
CPC ........................ G02B 17/0663; G02B 17/0657; G02B 23/08; G02B 27/14; H04N 5/2254; H04N 7/183; H04B 10/1125; B64C 30/00; G01S 3/786; G01S 7/497; G01S 17/58; G01S 17/66; G01S 17/95; G01J 9/00; G01J 2009/002; G01C 19/04; G01M 9/06; F41G 3/22
USPC ......... 359/198.1, 201.1–201.2, 212.1–212.2, 359/221.2, 225.1–226.2, 850, 853, 359/857–858, 861–863, 869; 701/1, 3, 14
See application file for complete search history.

(56) References Cited

U.S. PATENT DOCUMENTS

| | | | |
|---|---|---|---|
| 4,703,904 A | 11/1987 | Haslund | |
| 5,069,397 A | 12/1991 | Haslund | |
| 5,072,612 A | 12/1991 | Iverson, Jr. et al. | |
| 5,424,824 A | 6/1995 | Daiber et al. | |
| 5,775,643 A | 7/1998 | McMaster et al. | |
| 6,894,818 B1 | 5/2005 | Cicchiello et al. | |
| 7,430,499 B2 | 9/2008 | Rassaian et al. | |
| 7,598,901 B2 | 10/2009 | Tillotson et al. | |
| 7,686,253 B2 | 3/2010 | Lewis et al. | |
| 7,874,522 B2 | 1/2011 | Lewis et al. | |
| 7,880,666 B2 | 2/2011 | Tillotson et al. | |
| 7,889,328 B2 | 2/2011 | Tillotson | |
| 8,174,431 B2 | 5/2012 | Tillotson et al. | |
| 8,314,730 B1 | 11/2012 | Musiak et al. | |
| 8,350,894 B2 | 1/2013 | Turner et al. | |
| 8,376,284 B2 | 2/2013 | Lewis et al. | |
| 8,395,779 B2 | 3/2013 | Harkey et al. | |
| 8,412,048 B2 | 4/2013 | Dunlap | |
| 8,508,721 B2 | 8/2013 | Cates et al. | |
| 8,666,570 B1 | 3/2014 | Tillotson | |
| 8,749,766 B1 | 6/2014 | Wilkins et al. | |
| 8,833,153 B2 | 9/2014 | Adamson et al. | |
| 9,158,045 B1 | 10/2015 | Donaldson et al. | |
| 9,606,214 B2 * | 3/2017 | Kelchner | G01S 3/786 |
| 2005/0069325 A1 | 3/2005 | Cicchiello et al. | |

OTHER PUBLICATIONS

Extended European Search Reported for European Patent Application No. 15184901.5 dated Jan. 28, 2016.
Donald C. Wasburn, Ph.D., USAF Air Force Phillips Laboratory, *A High Altitude Propogation Experiment*, 1997.
R.R. Butts, US Air Force Phillips Laboratory, *The ABLE-ACE Wavefront Sensor*, 1997.
Coy et al., MZA Associates Corporation, *The ABLE ACE Pupil Plane Imaging Experiment*, 1997.
Jumper et al., Institute for Flow Physics and Control, University of Notre Dame, *The Airborne Aero-Optics Laboratory, AAOL*, 1997.
Defense Industry Daily, *DARPA's ABC of Airborne Lasers*, Jan. 22, 2013.

* cited by examiner

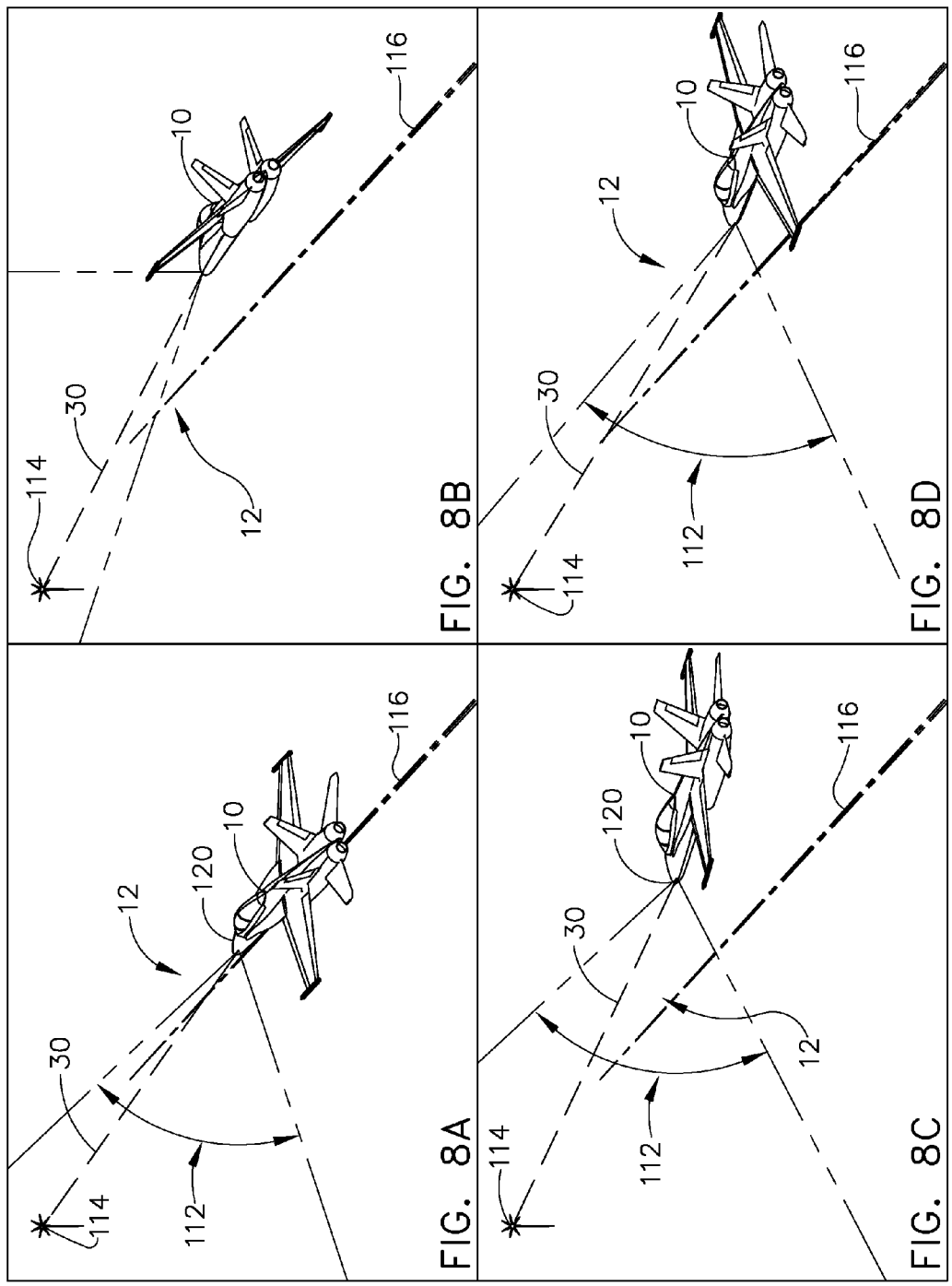

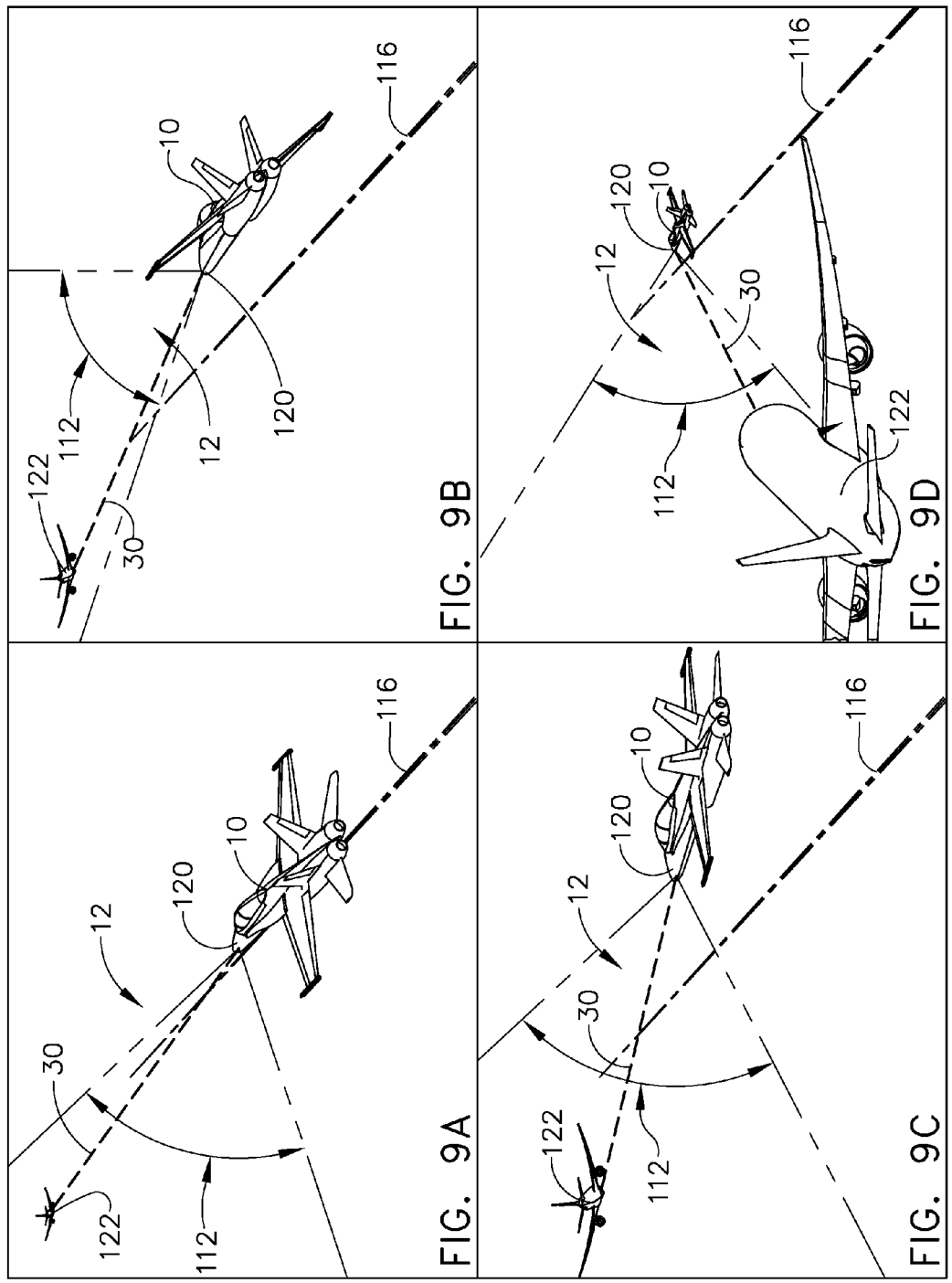

AERO-WAVE INSTRUMENT FOR THE MEASUREMENT OF THE OPTICAL WAVE-FRONT DISTURBANCES IN THE AIRFLOW AROUND AIRBORNE SYSTEMS

FIELD

This present disclosure generally relates to optical instrumentation and more particularly to optical instrumentation for measuring of optical disturbances in an air flow field.

BACKGROUND

As aircraft fly at subsonic, transonic or supersonic speeds, aero-optical disturbances in the air flow field surrounding the aircraft are created by surfaces of the aircraft moving through the air. These aero-optical disturbances will vary for each shape of an aircraft and as the aircraft changes speed, altitude and operational maneuvers. At higher speeds, such as supersonic, aero-optical disturbances in the air flow field surrounding the aircraft will include not only wavefront disturbances but also shock boundaries. These aero-optical disturbances created in the air flow field will affect the performance and/or accuracy of optical instrumentation which are carried by the aircraft and are used to receive optical data and/or emit optical energy.

The problems created by these aero-optical disturbances include tracking accuracy of optical trackers, blurred image quality of surveillance sensors, imprecise pointing of laser systems and reduced beam quality of laser energy propagated through the aero flow field containing the aero-optical disturbances. Gathering accurate spatial and temporal data of these aero-optical disturbances from the flow field of the aircraft will enable the design of high performance and accurate optical equipment such as optical trackers, optical imaging, laser radar, precise aiming equipment for lasers and laser weapon systems. With accurate measured data of these disturbances from the air flow field design criteria can be implemented into these devices to compensate for the optical deviations created by these aero-optical disturbances.

There is a need to be able to measure and collect aero-optical disturbance data for each different shape of air craft. Moreover, since the aero-optical disturbances change for various speeds, altitudes and maneuver configurations of the aircraft, the data will need to be compiled for changes in these parameters as well. Thus, to obtain reliable modeling data for a particular aircraft, measurements of the aero-optical disturbances would best be acquired through appropriate equipment for measuring and collecting such aero-optical data to be secured to the aircraft with the aircraft flown through these variations of parameters of speed, altitude and while conducting various maneuvers.

The aero-optical disturbances to be measured and collected for various aircraft, could include subsonic, transonic and supersonic speeds up to at least Mach 2. The measurements of the aero-optical disturbances are needed for the aircraft operating in an altitude envelope ranging from sea level to seventy-five thousand feet. Additionally, the measurements of the aero-optical disturbances will be needed from the aircraft conducting various maneuvers which impart as much as 3 g of force on the aircraft. All of this data will need to be accurately measured in order to provide reliable modeling for each aircraft that will eventually carry optical equipment, as discussed above.

In the past, aero-optic measurements had been obtained by using wind tunnels or by using large aircraft in flight to create the air flow fields. The use of wind tunnels to replicate the high speeds of a particular aircraft, and more particularly, supersonic speeds greater than Mach 1 presented complications. In particular, shock waves impacting a wall of the tunnel disrupt the replication and therefore fidelity of an aero-optical disturbance that would normally occur in open ambient air flow field flight. Because measurement equipment for aero-optical disturbances are generally large and complex equipment, larger aircraft have been needed to carry the equipment. The use of larger aircraft also presented an additional problem with their limited speed ranges. With the limited speed of these larger aircraft, measuring aero-optical disturbances at higher rates of speed were limited if not completely prevented. Moreover, the large complex instrumentation for measuring the aero-optic disturbances restricted the positioning or location of such equipment on the aircraft, thereby limiting the collection of data of air flow field disturbances to the limited positions on the aircraft to accommodate the large complex equipment.

In order to measure and compile the needed data regarding the aero-optic disturbances to provide modeling design criteria for optical instrumentation, measuring instrumentation needs to be developed that is compact. Compact measuring instrumentation can be secured to smaller aircraft such as fighter aircraft that can travel at a wide range of speeds from subsonic to supersonic. Also, a compact configuration will enable the measuring equipment to be secured to numerous different positions on the aircraft. This will enable measurements to be made from positions which would replicate the positions in which optical instrumentation may be later positioned. The compact size will also help to prevent creating unwanted aerodynamic imbalance of the aircraft.

A compact configuration of the measuring instrumentation will facilitate the measuring and collection of disturbance data for many different aircraft that will need to travel through a wide range of speeds and altitudes as well as with moving through various maneuvers. The compact configuration of the measuring equipment will provide the needed spatial and temporal data of the aero-optical disturbances in the flow field of that aircraft so as to establish the modeling in order to design the optical systems and/or flow control devices the aircraft will ultimately carry to operate within and/or mitigate these aero-optical disturbances.

The features, functions, and advantages that have been discussed can be achieved independently in various embodiments or may be combined in yet other embodiments further details of which can be seen with reference to the following description and drawings.

SUMMARY

An object of the present invention is to provide an aero-optical disturbance measurement system which includes a mirror supported by a gimbal for receiving a light beam from a light emitting source and reflecting the light beam emitted from the light emitting source to a first periscope fold mirror and a second periscope fold mirror positioned to receive the light beam reflected directly from the first periscope fold mirror. The measurement system further includes a first concave off-axis paraboloid mirror positioned to receive the light beam reflected from the second periscope fold mirror, a first fold mirror positioned to receive the light beam reflected directly from the first concave off-axis paraboloid mirror, a second fold mirror positioned to receive the light beam reflected directly from the first fold mirror and a second concave off-axis paraboloid mirror positioned to receive the light beam reflected directly from the second fold mirror and reflecting the light beam to a fast steering mirror. Additionally included is a fine tracker camera coupled to an embedded processer wherein the fine tracker camera receives a transmitted portion of the light beam from the fast steering mirror, wherein the embedded processor is coupled to the fast steering mirror such that the embedded processor controls movement of the fast steering mirror and wherein the embedded processor is coupled to the gimbal and controls the movement of the mirror supported by the gimbal.

Another object of the present invention is to provide an aero-optical disturbance measurement system which includes a mirror supported by a gimbal for receiving a light beam from a light emitting source and reflecting the light beam emitted from the light emitting source to a first periscope fold mirror. A second periscope fold mirror is positioned to receive the light beam reflected directly from the first periscope fold mirror. A first concave off-axis paraboloid mirror is positioned to receive the light beam reflected from the second periscope fold mirror. A first fold mirror is positioned to receive the light beam reflected directly from the first concave off-axis paraboloid mirror. A second fold mirror is positioned to receive the light beam reflected directly from the first fold mirror. A second concave off-axis paraboloid mirror is positioned to receive the light beam reflected directly from the second fold mirror and reflecting the light beam to a fast steering mirror. A beam splitter receives the light beam reflected directly from the fast steering mirror wherein the beam splitter splits the light beam into a transmitted portion and a reflected portion.

Another object of the present invention is to provide an aero-optical disturbance measurement system which includes a mirror supported by a gimbal for receiving a light beam from a light emitting source and reflecting the light beam emitted from the light emitting source to a fast steering mirror. A beam splitter receives the light beam reflected directly from the fast steering mirror wherein the beam splitter splits the light beam into a transmitted portion and a reflected portion. A fine tracker camera is coupled to an embedded processer wherein the fine tracker camera receives the transmitted portion of the light beam from the fast steering mirror, wherein the embedded processor is coupled to the fast steering mirror such that the embedded processor controls movement of the fast steering mirror and wherein the embedded processor is coupled to the gimbal and controls the movement of the mirror supported by the gimbal.

The features, functions and advantages that have been discussed can be achieved independently in various embodiments or may be combined in yet other embodiments further details of which can be seen with reference to the following description and drawings.

BRIEF SUMMARY OF THE DRAWINGS

FIG. 8A is a first panel view of utilizing a star as a light emitting source for data collection while in straight and level flight for initial star acquisition;

FIG. 8B is a second panel view of utilizing a star as a light emitting source for data collection while the aircraft executes a maneuver;

FIG. 8C is a third panel view of utilizing a star as a light emitting source for data collection while the aircraft resumes straight and level flight off the original flight path;

FIG. 8D is a fourth panel view of utilizing a star as a light emitting for data collection as the aircraft maneuvers to return to the original flight path;

FIG. 9A is a first panel view of utilizing an aircraft beacon as a light emitting source for data collection while in straight and level flight for initial beacon acquisition;

FIG. 9B is a second panel view of utilizing an aircraft beacon as a light emitting source for data collection while the aircraft executes a maneuver;

FIG. 9C is a third panel view of utilizing an aircraft beacon as a light emitting source for data collection while the aircraft resumes straight and level flight off the original flight path; and FIG. 9D is a fourth panel view of utilizing an aircraft beacon as a light emitting source for data collection as the aircraft maneuvers to return to the original flight path after passing by the beacon emitter.

DESCRIPTION

The present invention now will be described more fully hereinafter with reference to the accompanying drawings, in which example implementations are shown. The invention may be embodied in many different forms and should not be construed as limited to the examples set forth herein.

Figure 1:
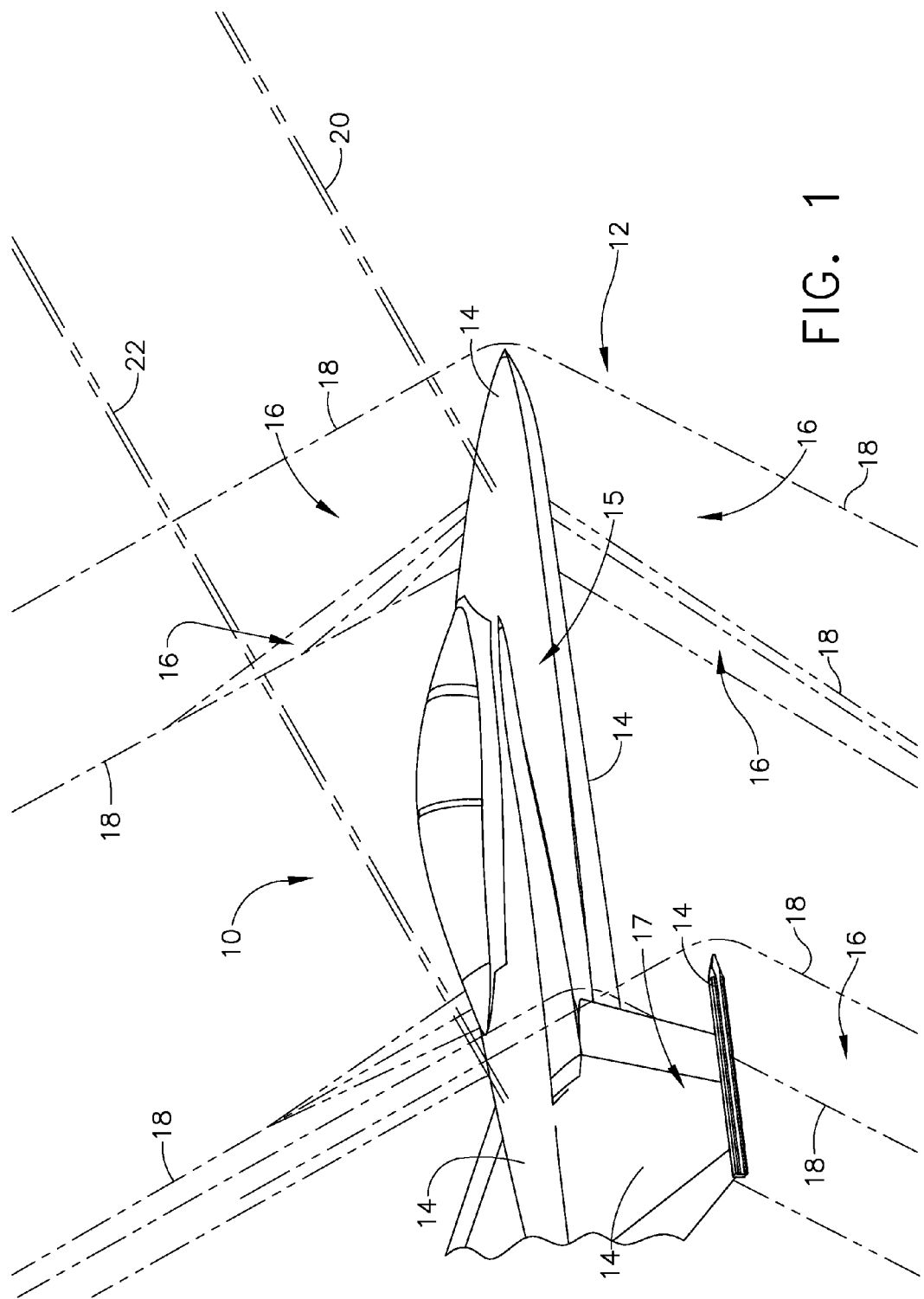
FIG. 1 illustrates a perspective schematic view of an aircraft in a flow field wherein representative optical beams pass through the flow field to the aircraft.
Figure 6:
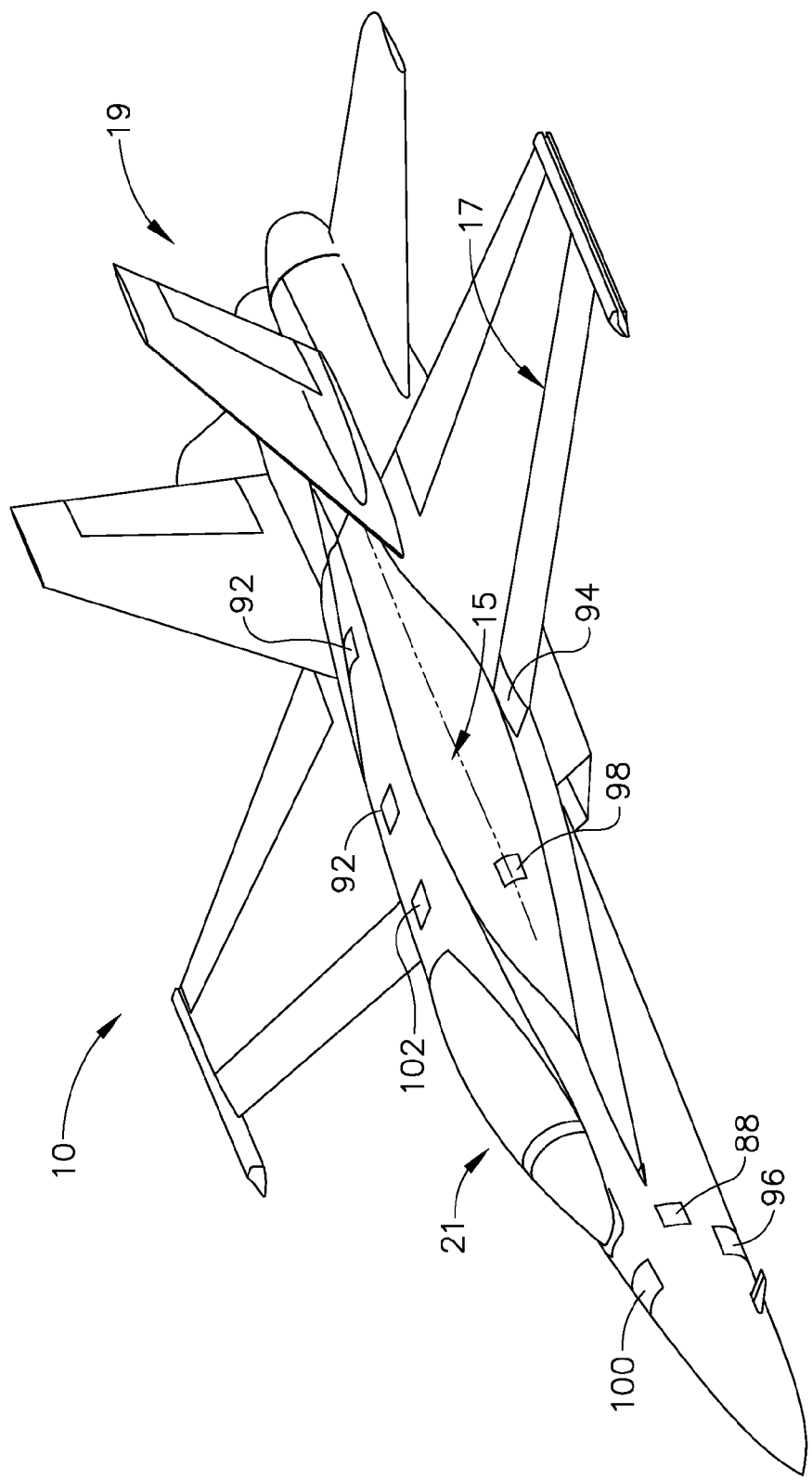
FIG. 6 is a schematic perspective view of a fighter aircraft to which an embodiment of the aero-optical wave disturbance measurement system of FIG. 1 will be secured.

In referring to FIG. 1, in flight aircraft 10, in this embodiment, is an F 18. Aircraft 10 creates an air flow field 12 as it passes through the atmosphere. Disturbances are created in air flow field 12 as surfaces 14 of aircraft 10 impact the air. Surfaces 14 include all external surfaces associated with aircraft 10 that is exposed to air flow field 12, as seen in FIGS. 1 and 6. Such surfaces include fuselage 15, wings 17, tail section 19, cockpit 21 etc. as well as all other external surfaces associated with aircraft 10 including items appended to aircraft 10 such as weapons and the like. As surfaces 14 vary in configuration with different aircraft 10 the resulting aero-optical disturbances created within air flow field 12 will differ in shape and distance from aircraft 10. These aero-optical disturbances will be further altered as aircraft 10 varies its speed and altitude and as aircraft 10 proceeds through various maneuvers.

It should be understood that depending on the shape of surface 14 over which portions of air flow field 12 flows, the speed of the moving air may differ. For example, if surface 14 is cambered the air flow will be faster over the cambered surface 14 than over a flatter surface 14. Thus, air speed on some portions of air craft 10 may be traveling, for example, at supersonic speed in contrast to air speeds at different locations on air craft 10 which may be traveling at a transonic speed. Thus, the resulting disturbances in flow field 12 about air craft 10 are not necessarily homogeneous or uniform from one location on aircraft 10 to another.

As aircraft 10 flies at subsonic to transonic and into supersonic speeds, the air in air flow field 12 will experience compression from surfaces 14 of aircraft 10. For example, compression of the air at supersonic speeds creates shock waves/boundaries 18 with regions of continuous flow 16 between the shock waves/boundaries in the aero-optical disturbances in air flow field 12. These disturbances are created outwardly from surfaces 14 of aircraft 10 as represented, for example, schematically by alternating regions of shock waves/boundaries 18 and continuous flow regions 16. Over curved surfaces multiple, weaker shock waves/boundaries 18, coalesce into a stronger shock wave/boundary 18, as seen in FIG. 1. The disturbances will take on various configurations and will also vary in distance from aircraft 10 as speed, altitude and maneuver configurations of this particular aircraft 10 vary.

These disturbances inclusive of the shock waves/boundaries 18 and the continuous flow regions 16 in air flow field 12 will affect optical path reception and transmission by optical equipment carried by aircraft 10. Examples of paths of optical path transmission or reception are schematically shown as paths 20 and 22, in FIG. 1. The optical equipment or devices on board aircraft 10 associated with these optical transmissions or receptions may include, for example, optical trackers, surveillance sensors, laser-aiming systems and laser-energy-propagating weapons. In order for these devices to operate accurately, effectively and efficiently, they will need to reliably compensate for optical path variations caused by the disturbances within air flow field 12 as aircraft 10 flies through the atmosphere. A major step in accomplishing this goal of reliable performance is to acquire reliable measurements of the aero-optical disturbances in air flow field 12 so as to incorporate such measurement data into the design of these optical pieces of equipment.

Figure 2:
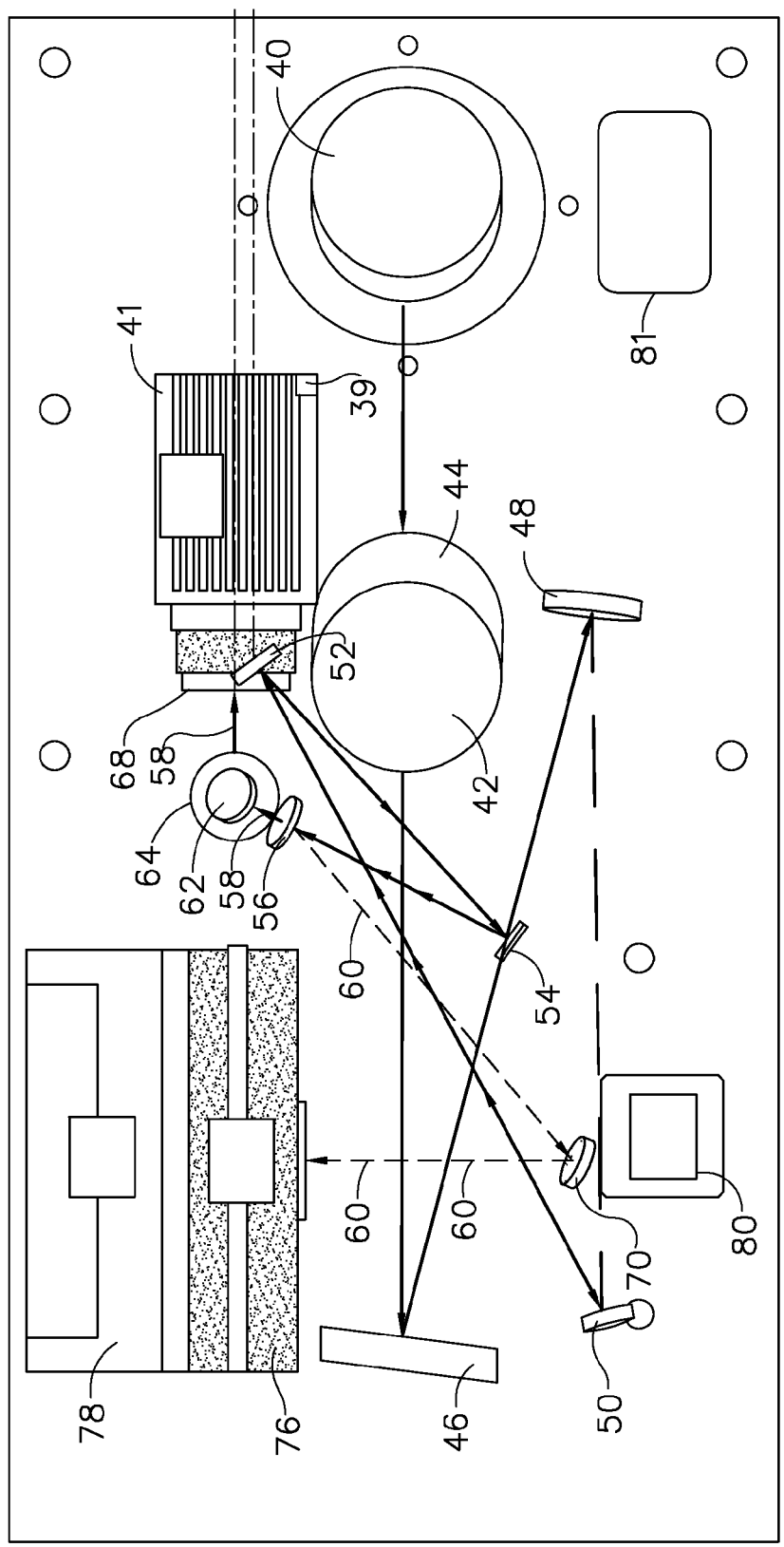
FIG. 2 illustrates a back elevation view of a schematic representation of an embodiment of the wavefront measuring system.
Figure 3:
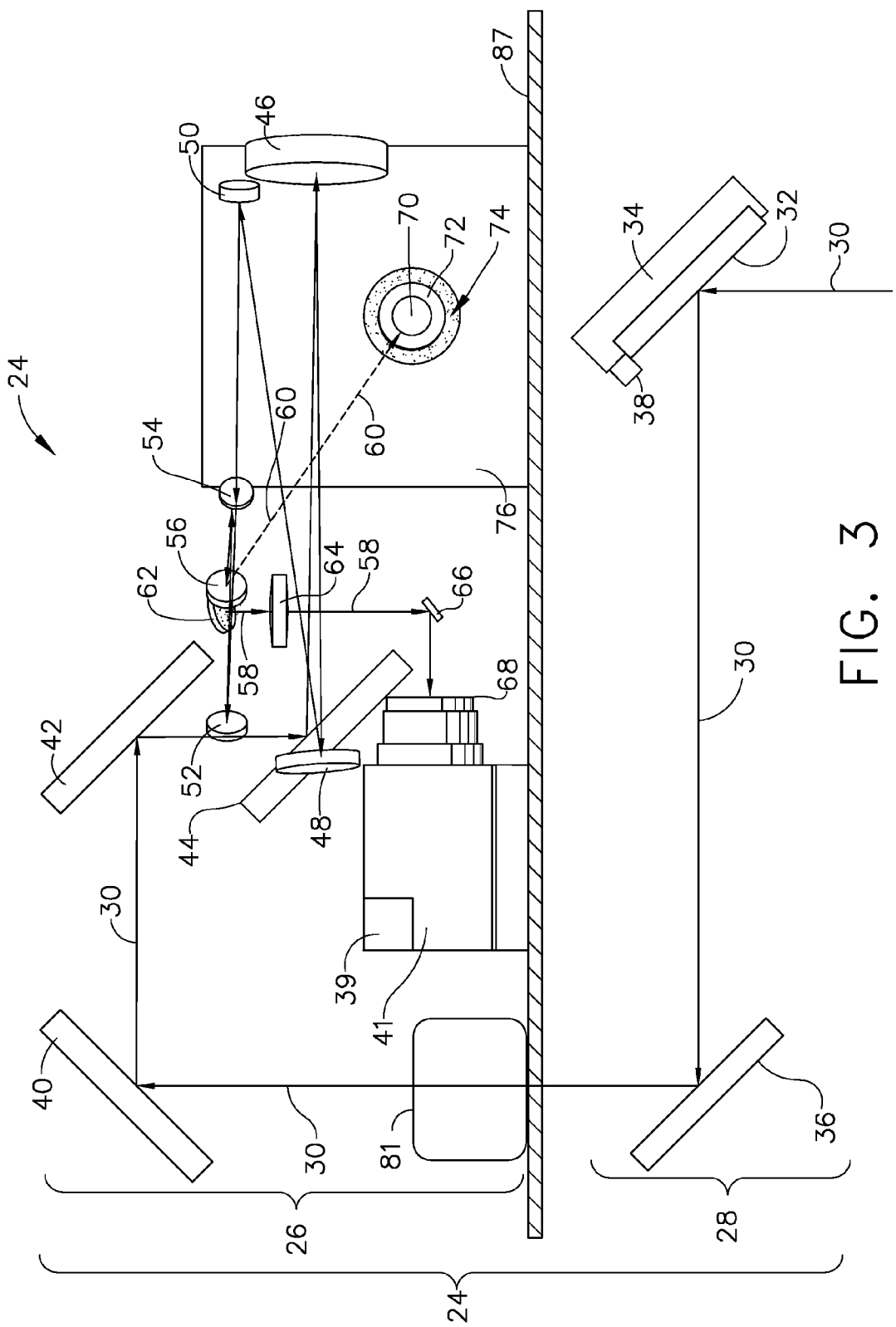
FIG. 3 illustrates a top plan view of a schematic representation of aero-optical disturbance measurement system.
Figure 4:
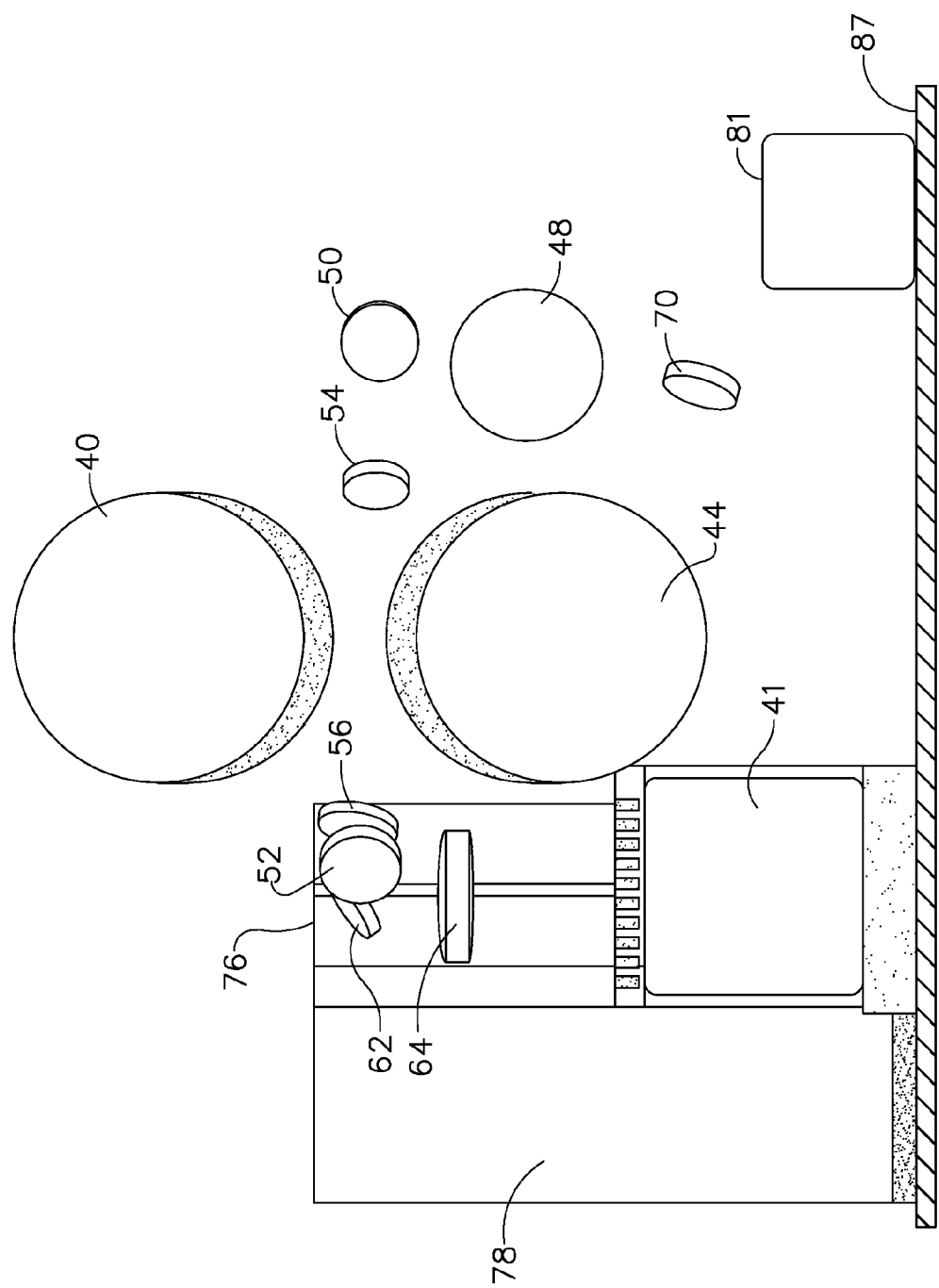
FIG. 4 illustrates a side elevation view of the schematic representation of the wavefront measuring system as shown in FIG. 2.

In referring to FIGS. 2-4, an embodiment of aero-optical disturbance measurement system 24 is shown that can be mounted on aircraft 10 to acquire the needed data by spatially and temporally measuring the position and contour of the aero-optical disturbances created by flight of aircraft 10 in air flow field 12. System 24, as seen in FIG. 3, in this embodiment, includes wavefront measuring system 26 and gimbaled mirror system 28. An example of each of these systems 26 and 28 will be discussed in detail herein as will their operation.

With aero-optical disturbance measurement system 24 secured to aircraft 10, measurement data of the optical disturbance in air flow field 12 will be acquired by receiving and analyzing a light beam that has traveled through the optical disturbance before reaching aircraft 10. For purposes of this embodiment, light emitting sources such as a star, a beacon from another aircraft, a beacon from a ground source, a laser guide star or an artificial star may be selected for use by system 24. The light source needs to be sufficiently strong enough to operate with system 24 such that, for this embodiment, system 24 is configured to work with a light beam source or star with a visual magnitude of (Mv-'3) or brighter.

In referring to FIGS. 2-4, light beam 30, as seen in FIG. 3, originates from a light emitting source, such as, in this embodiment, a star and enters gimbaled mirror system 28, as seen in FIG. 3, impacting mirror 32 supported by gimbal 34. Mirror 32 reflects light beam 30 directly to first periscope fold mirror 36. In this embodiment, this gimbaled mirror system 28 is a known as Cast Glance Gimbal, originally manufactured by Hughes Optical Systems in 1974, and is currently being manufactured by The Boeing Company. It has been utilized for both the missile and target tracking by the U.S. Navy and installed on the NP3D Aircraft.

This gimbaled mirror system 28 has been modified in this embodiment to include a gyro sensor 38 such as a dual axis DSP-1750/Digital Output fiber optic gyro, manufactured by KVH Industries of Middleton, R.I. Gyro sensor 38 is coupled to mirror 32 and senses movement of mirror 32 during flight based on movement of aircraft 10 and communicates this movement to embedded processor 39, embedded in and coupled to fine tracker camera sensor 41. In turn, embedded processor 39 is coupled to gimbal support 34 and communicates corrective movements to be made by gimbal support 34 to mirror 32 to keep light beam 30 aligned with mirror 32 as aircraft 10 moves in flight. More details as to embedded processor 39, its coupling with gimbaled support 34 and the movements imparted to mirror 32 be will be discussed below.

With system 24 secured to aircraft 10 traveling at speeds up to and beyond Mach 1 and conducting maneuvers, light beam 30 would otherwise move out of alignment with mirror 32 or otherwise out of the field of regard of mirror 32, unless corrective movements were made to mirror 32 to compensate for the movement made by aircraft 10 in its maneuvers. For example, with aero-optical disturbance measurement system 24 secured to aircraft 10 to acquire aero-optic disturbance measurements and with aircraft 10 flying through a maneuver, mirror 32 moves relative to light beam 30. Gyro sensor 38 senses this movement of mirror 32 and sends this movement data or information to embedded processor 39. Gyro sensor 38 has a bandwidth connection range of 10 Hz to 100 Hz with embedded processor 39. Embedded processor 39, in return, commands gimbal support 34 to move mirror 32 to keep light beam 30 in proper alignment with mirror 32. Gimbal 34 operates with an angular sensing of <4 microradians in resolution over a field of regard of +/−45 degrees in azimuth and elevation, and a maximum angular rate of >60 degrees/second in azimuth and elevation.

Embedded processor 39, as mentioned above, is coupled to a fine tracker camera 41, which will be discussed in more detail below. In this embodiment, embedded processor includes: Field Programmable Gate Array (FPGA) such as the Xilinx Spartan-6 LX150T (with support for LX100T and LX75T); Boot Flash Memory; XMOS Supervisory Processor; 2×QDR-II SDRAM; Support for two 4×SDRAM interposer modules; NAND Flash providing 4 GBytes of storage space; Sensor I/O supporting Camera Link; PCI-Express ×1 Support; and 1 GbE to FPGA. Processor 39 further includes: General Purpose Processor (GPP) such as Freescale QorIQ P1022; 512 Mbytes DDR3 SDRAM with ECC; 12C RTC (via expansion IO); 12C Temperature Sensor; Serial Peripheral Interface (SPI) Configuration Flash; NAND Flash memory; Processor Reset (via expansion IO); 10-bit communications link between the FPGA modules supervisory processor (via expansion IO); PCI Express ×1, Gen 1.0 to FPGA modules Spartan FPGA (via expansion IO); Gigabit Ethernet (via expansion IO); and Solid State Disk storage (via expansion IO). Embedded processor 39 is coupled to gimbal support 34 with a bandwidth connection range of 10 Hz to 100 Hz. Gimbal support 34 operates with a position sensing of <4 microradians in stroke over a field of regard of +/−45 deg in azimuth and elevation, and a maximum angular rate of >60 deg/sec in azimuth and elevation.

With embedded processor 39 receiving movement data with respect to mirror 32 from gyro sensor 38, embedded processor sends movement commands to gimbal 34 to move mirror 32 and maintain mirror 32 properly positioned to maintain light beam 30 from the light emitting source in the field of regard for mirror 32 The Cast Glance actuators can drive the gimbal with a maximum acceleration of >1700 deg/sec$^2$ in azimuth, and >400 deg/sec$^2$ in elevation.

Gimbaled mirror system 28 would also include, in this embodiment, use of encoders between the stabilized platform, provided by gyro sensor 38, and the turning flat to enforce stabilized kinematics, as well as, a two (2) to one (1) encoder-synchronized drive between the stable platform and the turning flat. In addition, the gimbal uses rotational flexures and rotary voice coils instead of bearings or commutated or brushed DC motors.

With aero-optical disturbance measurement system 24 mounted to aircraft 10, particularly one that can attain supersonic speed, high vibration can be imparted to gimbaled mirror system 28. In this embodiment, highly damped passive isolators will be used on gimbal support 34. Additionally, at least a 100 Hz gyro stabilized loop can be employed utilizing gyro sensor 38 and gimbal support 34 to make corrective movements to mirror 32 for large angle pointing to the light emitting source, such as a star or other aircraft, etc. Moreover, use of vibration data collected on a Boeing F-15E with a Shock Wave package at 1.2 and 1.4 Mach can be input, for example, to a Simulink Model, or other model or simulation, of the gyro sensor 38 stabilized gimbal 34. The residual line of sight jitter is predicted to be less than 3.0 microradians for base motion jitter. This allows the Fine Track sensor 41, controlled by the embedded processor 39, to reduce the optical disturbance in the air flow field 12, by commanding correction to the fast steering mirror 54.

In this embodiment, first periscope fold mirror 36, of gimbaled mirror system 28 receives light beam 30 directly from mirror 32 supported by gimbal 34 and reflects light beam 30 directly toward second periscope fold mirror 40 of wavefront measuring system 26, as shown in FIG. 3. Second periscope fold mirror 40 receives light beam 30 directly from first periscope fold mirror 36 at, in this embodiment, a forty five degree (45°) angle of incidence. Second fold mirror 40 has, in this embodiment, a four (4) inch minor axis ellipse with a broad band coating of greater than ninety eight percent (98%) reflectivity. Light beam 30 is reflected from second periscope fold mirror 40 directly to first intermediate fold mirror 42. First intermediate fold mirror receives light beam 30 at, in this embodiment, a forty five degree (45°) angle of incidence. First intermediate fold mirror 42 has a three (3) inch minor axis ellipse with a broad band coating of greater than ninety eight percent (98%) reflectivity. In turn, first intermediate fold mirror 42 reflects light beam 30 directly to second intermediate fold mirror 44 wherein second intermediate fold mirror 44 also receives light beam 30 at, in this embodiment, a forty five degree (45°) angle of incidence. Similarly, second intermediate fold mirror 44 has, in this embodiment, a three (3) inch minor axis ellipse with a broad band coating of greater than ninety eight percent (98%) reflectivity.

Light beam 30 reflects from second intermediate fold mirror 44 directly to first concave off-axis paraboloid mirror 46. First concave off-axis paraboloid mirror 46 has, in this embodiment, a broad band coating of greater than ninety eight percent (98%) reflectivity. Light beam 30 is received by first concave off-axis paraboloid mirror 46 at an angle of incidence, in this embodiment, of less than eight degrees (8.0°). Light beam 30 reflects from first concave off-axis paraboloid mirror 46 directly to first fold mirror 48. First fold mirror 48 is, in this embodiment, a pupil relay with a broad band coating of greater than ninety eight percent (98%) reflectivity. Light beam 30 is received by first fold mirror 48 at an angle of incidence, in this embodiment, of less than eight degrees (8.0°). Light beam 30 reflects directly from first fold mirror 48 to second fold mirror 50 and is received by second fold mirror 50 at an angle of incidence of, in this embodiment, of less than fifteen degrees (15.0°). Second fold mirror (50) is, in this embodiment, also a pupil relay with a broad band coating of greater than ninety eight percent (98%) reflectivity.

Light beam 30 is reflected directly from second fold mirror 50 to second concave off-axis paraboloid mirror 52. Second concave off-axis paraboloid mirror 52 receives light beam 30 at an angle of incidence, in this embodiment, of less than eight degrees (8.0°). Second concave off-axis paraboloid mirror 52, in this embodiment, is an off-axis parabola mirror pupil relay with a broad band coating of greater than ninety eight percent (98%) reflectivity. Light beam 30 reflects directly from second concave off-axis paraboloid mirror 52 to fast steering mirror 54 which is, in this embodiment, one inch (1") in diameter with a broad band coating of greater than ninety eight percent (98%) reflectivity and a bandwidth of 100 to 1000 Hz.

Fast steering mirror 54, in this embodiment, is an OIM101 one inch FSM, manufactured by Optics In Motion LLC located in Long Beach, Calif. Fast steering mirror 54 is coupled to embedded processor 39 and fine tracker camera 41 to create a communication loop to provide fast steering mirror 54 movement, with an angular stroke length within the range of +1.5 degrees and −1.5 degrees and angular resolution of <2 microradian and operates in a bandwidth connection with embedded processor 39 at 100 to 1000 Hz, to compensate for jitter imparted to light beam 30 by flight of aircraft 10. This jitter is created on the optical beam by the aircraft 10 vibrations, and the aero-optical disturbances from the flow field 12, the shock wave 16, and the shock boundary 18 at various look angles around the aircraft. To create this communication loop, in part, fast steering mirror 54 is coupled to fine tracker camera 41 through a transmitted portion 58 of light beam 30. Light beam 30 reflects from fast steering mirror 54, in this embodiment, directly to beam splitter 56.

Beam splitter 56 has, in this embodiment, a one inch (1") diameter with a broad band coating with a fifty percent (50%) reflectivity and receives light beam 30 at an angle of incidence, in this embodiment, of less than eight degrees (8.0°).

In this embodiment, beam splitter 56 is a broadband plate beam splitter manufactured by CVI Laser Optics of Albuquerque, N. Mex. This beam splitter has a brand CVI Laser Optics with optical material: N-BK7 glass; Surface Quality: 10-5 scratch and dig; Product Code: BBS; Adhesion and Durability: Per Mil-C-675C. insolvable in lab solvents; Clear Aperture: greater or equal to eighty five percent (85%) of central diameter; Coating Technology: Electron beam multilayer dielectric; Chamfer: 0.35 mm at forty five degrees (45°) (typical); Wedge: less than or equal to five (5) arc min; Damage Threshold: one hundred (100) mJ/cm$^2$ for twenty (20) nsec, and twenty (20) Hz @one thousand sixty four (1064) nm; Thickness t+ or −0.25 mm; Diameter: ø+0/−0.25 mm; Surface Figure: λ/10 at 633 nm; Reflection: $R_{unpolarized}$=50%+ or −15%; and Coating on S2: Low-reflection Broadband Anti-Reflective coating. Beam splitter 56 splits light beam 30 into a portion 58 and another portion 60.

A portion of light beam 30 which passes through beam splitter 56 is referred to as transmitted portion 58 of light beam 30. Transmitted portion 58, in this embodiment, is received directly from beam splitter 56 by f first tracker fold mirror 62 having, in this embodiment, a one inch (1") diameter with a broad band coating with greater than ninety eight percent (98%) reflectivity. First tracker fold mirror 62 receives transmitted portion 58 of light beam 30 at, in this embodiment, a forty five degree (45°) angle of incidence. Achromatic focusing lens 64 with a broad band AR coating receives transmitted portion 58 of light beam 30 at normal or perpendicular angle of incidence. Second tracker fold mirror 66 has, in this example, a one inch (1") diameter on the semi-minor axis with a broad band coating with greater than ninety eight percent (98%) reflectivity. Second tracker fold mirror 66 receives transmitted portion 58 of light beam 30 from achromatic focusing lens 64 at, in this example, a forty five degree (45°) angle of incidence and reflects transmitted portion 58 directly to filter wheel assembly 68 associated with fine tracker camera 41 and positioned between second tracker fold mirror 66 and fine tracker camera 41.

Filter wheel assembly 68 may be applied to optimize the signal from a star, in contrast, it may not be applied wherein the light emitting light source may be a beacon carried by an aircraft. With transmitted portion 58 of light beam 30 passing through filter wheel assembly 68, transmitted portion 58 reaches fine tracker camera 41. Fine tracker camera 41 senses movement of transmitted portion 58 of light beam 30.

Fine tracker camera 41, in this embodiment, utilizes a Xenics Bobcat 640CL Shortwave Infrared (SWIR) that is capable of 1700 Hz frame rate in a 128×128 windowed mode. With fine tracker camera 41 coupled to embedded processor 39, with embedded processor 39 coupled to fast steering mirror 54 and with fast steering mirror 54 coupled to fine tracker camera 41 by way of transmitted portion 58 of light beam 30, the communication loop is complete for fine tracker camera 41 to sense movement of transmitted portion 58 of light beam 30 and communicate that data to embedded processor 39 which, in turns, sends commands to fast steering mirror 54 to move fast steering mirror 54 accordingly. This communication loop will operate to mitigate jitter imparted to aero-optical disturbance measurement system 24 by the high speed travel of aircraft 10.

Returning to beam splitter 56, beam splitter 56 divides light beam 30. Beam splitter 56 transmits a portion, transmitted portion 58, of light beam 30 and reflects another portion of light beam 30, now referred to as reflected portion 60, Reflected portion 60 is directed from beam splitter 56 to first wave sensor fold mirror 70 having, in this embodiment, a semi-minor axis diameter of one inch (1") and with a broad band coating of greater than ninety eight percent (98%) reflectivity. Reflected portion 60 is received by fold mirror 70 at an angle of incidence, in this embodiment, of less than fifteen degrees (15.0°) and reflects reflected portion 60 of light beam 30 directly to achromatic pupil relay 72 which, in this example, has a broad band AR coating. Reflected portion 60, in this embodiment, is received by achromatic pupil relay 72 at a normal angle of incidence.

Reflected portion 60 of light beam 30 passes on to wavefront sensor lenslet array 74 which are configured to capture spatial and temporal wavefront parameters associated with aero-optical disturbances created by aircraft 10 in flow field 12. This would include shock boundaries 18 with aircraft 10 traveling at various speeds inclusive of supersonic. Lenslet array 74 includes an array of lenslets of at least 16×16 subapertures or a set of lenslets of 24×24 subapertures. In this embodiment, wavefront sensor includes the Xenics Cheetah-640CL with 24×24 sub-apertures with 5×5 pixels per sub-apertures in a 120×120 window which would enable wavefront collection, in this example, at 15 kHz. Lenslet array 74 focuses reflected portion 60 to a focal plane array wavefront camera 76. Wavefront camera 76 thereby receives temporal and spatial data of the aero-optical disturbances in flow field 12 from reflected portion 60 of light beam 30 which has passed through wavefront sensor lenslet array 74. Wavefront camera 76, in this embodiment, includes a 512×512 Short Wave Infrared focal plan and has a frame rate of greater than five (5) kHz.

Wavefront sensor lenslet array 74 and wavefront camera 76 are coupled to sensor power supply, which includes a signal interface and another embedded processor 78, which also includes a solid state data storage devices such as, SAMSUNG 840 Pro Series MZ-7PD128BW 2.5" 128 GB SATA III MLC Internal Solid State Drive (SSD). The solid state data storage will store the temporal and spatial measured data of the aero-optical disturbances created by aircraft 10 received from the wavefront sensor lenslet array 74 and wavefront camera 76, along with, corresponding operational or navigational data from aircraft 10. This stored data can then be used to design optical instrumentation which will later be installed on aircraft 10. Additional equipment to support aero-optical disturbance measuring system 24, shown in FIGS. 2-4, includes gimbal electrical interface port 80 and fast steering mirror power supply and controller 81.

Figure 5:
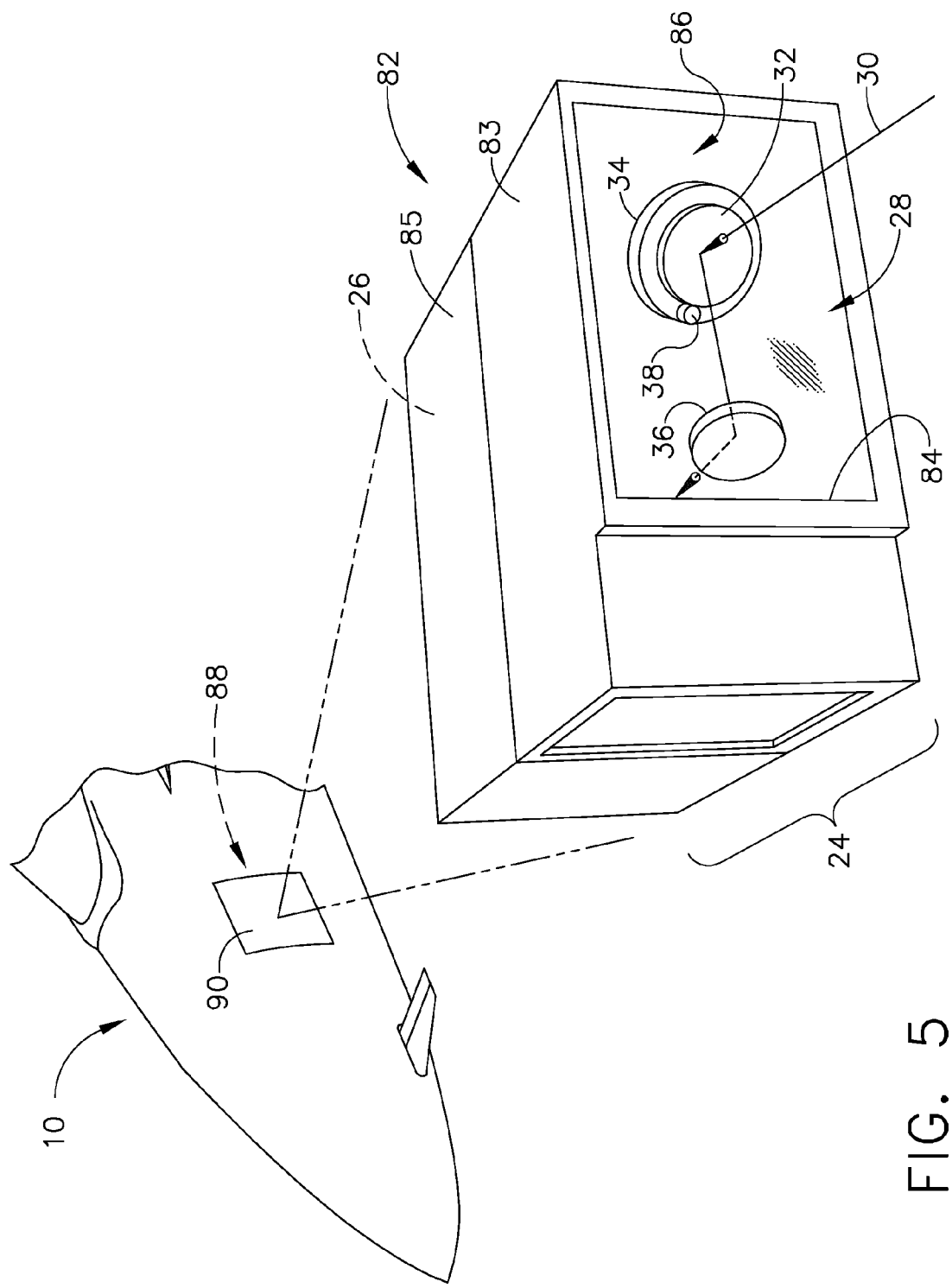
FIG. 5 is an enlarged exploded schematic cut away view of a front end of a fighter aircraft with an enlarged view of an embodiment of a contained aero-optical wave disturbance measurement system of FIG. 3 secured to the fighter aircraft.

The above described wavefront measuring system 26 and the gyro stabilized gimbaled mirror system 28 permit aero-optical disturbance measurement system 24 to be contained within a compact arrangement as seen in FIG. 5. For example, wavefront measuring system 26, without the Cast Glance gimbal 28, can be assembled in an arrangement approximately eight inches (8")×ten inches (10")×twenty inches (20") with a weight of between thirty-four (34) and forty (40) pounds. With the Cast Glance gimbal 28, the dimensions are eight inches (8")×nineteen inches (19")×twenty inches (20") with a weight of between one hundred seventy (170) and one hundred seventy five (175) pounds. With the ability to provide wavefront measuring system 26 with this light weight and compact arrangement, the gyro-stabilized gimbaled mirror system 28 can be secured to system 26 and measurement system 24 can now be secured at many different locations on aircraft 10. This compact arrangement will permit measurement system 24 to be installed on smaller fighter aircraft that can attain supersonic speeds and not disrupt the aerodynamics of the aircraft.

In referring to FIG. 5, wavefront measuring system 26 and the gyro stabilized gimbaled mirror system 28 are each contained within containers 85 and 83, respectively. Containers 83 and 85 are firmly secured together to form container assembly 82. Container 83 includes a front side 84 which defines opening 86 and permits gimbaled mirror system 28 to be exposed to incoming light, such as light beam 30. With respect to wavefront measuring system 26, it is housed within container 85. Optical components within wavefront measuring system 26 are held rigidly within back container 85 with a carbon foam composite structure (not shown) and mounted to a carbon fiber bench 87, as seen in FIG. 3. Containers 83 and 85 are typically constructed of aluminum with a thermal isolator to match the coefficient of thermal expansion of the optical bench.

With container assembly 82 assembled, it is ready to be secured to aircraft 10 with passive isolators such as Barry Isolator Series 1000, which meets the Mil-M-17185 environment spec with a temperature range of −65 degrees F. to +180 degrees F., and Mil-STD-167 vibration specification. As for example, container assembly 82 is secured to a side of nose barrel position 88, as seen in FIG. 5. As will be discussed in more detail, container assembly 82 will, in this embodiment, be positioned at a number of locations on aircraft 10 to measure and collect temporal and spatial data of aero-optical disturbances in air flow field 12 surrounding different portions of aircraft 10. Typically container assembly 82 containing aero-optical disturbance measuring system 24 will be positioned behind a window or conformal window 90 as shown in FIG. 5. Light beam 30 coming from a light emitting source such as a star or another aircraft or ground location etc. will pass through an aero-optical disturbance in air flow field 12, pass through window or conformal window 90 and then through opening 86 of container 83. Light beam 30 will then reflect off of mirror 32 supported by gimbal 34 and first periscope fold mirror 36 and into wavefront measuring system 26 where light beam 30 is received by second periscope fold mirror 40. On other occasions, container assembly 82 containing system 24 will be secured on an external portion of aircraft 10 behind a window which is not a conformal window 90 or at other positions of aircraft 10 wherein a conformal window 90 is employed.

As seen in FIG. 6, this embodiment portrays an F-18 fighter aircraft 10. As discussed above, container assembly 82 will be secured to the F 18 aircraft 10 and positioned, for example, behind conformal window 90 at locations including: dorsal mid-body (two locations) 92; wing gun location 94; electro-optical targeting system 96 or on other aircraft a lower gun bay; conformal fairing 98; upper nose barrel 100; and dorsal behind cockpit 102. With measurement system 24 positioned at these various locations, aero-optical disturbance data can be measured and collected around aircraft 10. A single measurement system 24 may be employed on aircraft 10 or multiple measurement systems 24. With the collected measured data, modeling for optical equipment that will be positioned at these various locations will be compiled to create design criteria for the optical equipment to be able to accommodate optical deviations created by the aero-optical disturbances positioned in air flow field 12 of aircraft 10.

Figure 7:
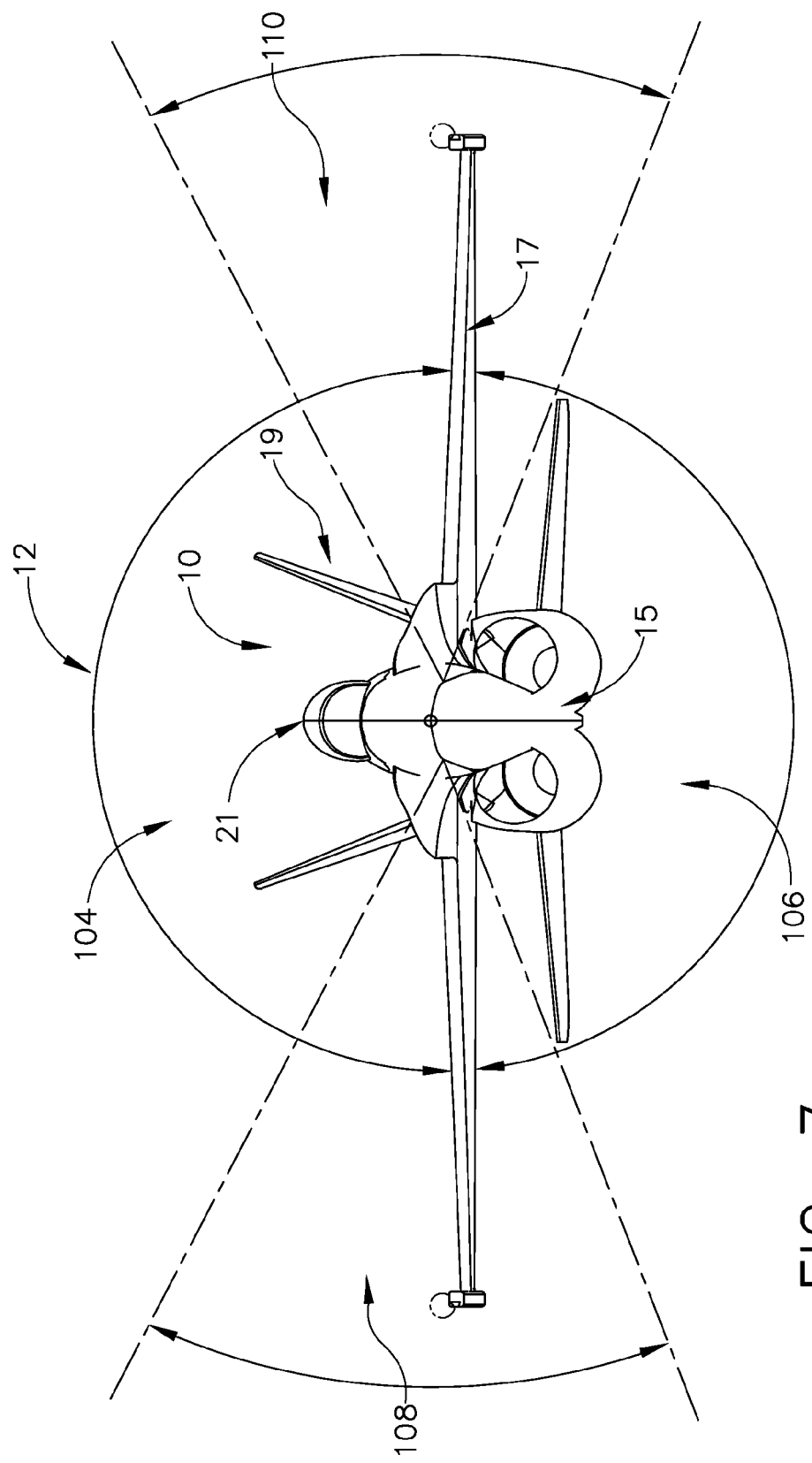
FIG. 7 is a schematic front profile view of an aircraft depicting sensor location options for characterization of flow field.

As seen in FIG. 7, in this embodiment aircraft 10 is an F 18 in flight and sectors about aircraft are demarked to indicate possible field of regard of positions of measuring system 24 taking measurements with aircraft 10 in flight. In referring to FIG. 7, these sectors positioned about aircraft 10 include top sensor field of regard 104; bottom sensor field of regard 106; right hand sensor field of regard 108 and left hand sensor field of regard 110. Regardless, of the positioning of aero-optical disturbance measuring systems 24 on aircraft 10, the flight geometries for the testing for acquisition of data will depend on the field of regard of the optical system within system 24 and the location and speed of the light emitting source.

To fully characterize the air flow field 12 around aircraft 10 would require the optical system field of regard to be $4\pi$ steradians which would require more than one sensor or system 24. Although multiple systems 24 are possible to be secured to the top and bottom of aircraft 10 this is not necessary for a characterization or data acquisition flight. The air flow around aircraft 10 is substantially the same on the left hand side field of regard 110 and the right hand side field of regard 108. The differences in the air flow field 12 around aircraft 10 will occur in top and bottom fields of regard 104 and 106.

Measurement system 24 should be in a position on aircraft 10 to characterize top 104 and bottom 106 of flow field 12. The better position for this would be on either side of the fuselage 15 of aircraft 10 with sufficient field of regard to measure or characterize flow field 12 above, below, side, forward and aft of aircraft 10. However, the larger the field of regard also minimizes the required aircraft 10 maneuvering to view the light emitter source, whether a star or another aircraft etc., and increases the available data collection time. However, the larger the field of regard, the larger the window or conformal window 90 will be needed.

Should window 90 be non-conformal and forms a blister, for example, on the external surface of aircraft 10, will require a different gimbal mirror with greater field of regard. The blister configuration will change the flow field 12 being measured. It is understood the aero-optical measuring system 24 comprising gimbal mirror system 28 and wavefront measuring system 26 can be secured to a wide variety of aircraft that have a fuselage and at least one aerodynamic interface surface, such as, a fixed wing 17, stabilizing fin, rotary blade etc. and not be secured only to an airplane such as aircraft 10. The wide variety of aircraft, in addition to the airplane, would include, for example, a rocket, missile, helicopter, aircraft that have fixed wings with helicopter functionality capabilities etc. These aircraft would provide a platform from which aero-optical measuring system 24 would measure aero-optical disturbances in the flow field surrounding that particular aircraft.

As mentioned above, the data measuring or characterization flights that will employ aero-optical disturbance measuring system 24, will use a star, or a beacon from another aircraft or from the ground etc. as its light beam 30 source to pass through measuring system 24. System(s) 24 will, in this embodiment, be secured within container assembly 82 and, in turn, be firmly secured to a desired location on aircraft 10. It is contemplated that securement of system 24 behind conformal window 90 will provide the least intrusion to air flow field 12, however, other data acquiring may cause system 24 to be secured behind a non-conformal window creating an anomalous surface on aircraft 10 affecting air flow field 12.

Now referring to FIGS. 8A-8D, aero-optical disturbance measuring system 24 was developed, in this embodiment, to fly on an aircraft 10 to measure and acquire aero optical disturbances in air flow fields of aircraft 10, as shown. In particular, measuring system 24 was developed so as to be able to use system 24 on a smaller type aircraft, such as a fighter aircraft, in order to be able to secure system 24 to multiple locations on aircraft 10 without disrupting the aerodynamics of aircraft 10 and to be able to acquire data in a wide range of air speeds including supersonic.

In an embodiment of a flight for measuring and acquiring aero-optical disturbance data, as shown in FIGS. 8A-8D, in this embodiment, an F-18 aircraft 10 commences flying along a flight path 116 with measuring system 24 secured to a forward nose barrel position 100. In this embodiment, aircraft 10 is traveling at 1.6 Mach at an altitude of thirty thousand feet (30,000 ft). Measuring system 24 is operating at a ninety degree (90°) full field of regard 112 and receives a light beam 30 from a light emitting source, star 114, having a magnitude of Mv3 or brighter. Light beam 30 is received by mirror 32 supported by the gimbal 34, within a gyro stabilized gimbal mirror system 28. Light beam 30 passes through wavefront measuring system 26 inclusive of fast steering mirror 54 and through beam splitter 56. Beam splitter 56 splits light beam 30 into a transmitted portion 58 and a reflected portion 60. Transmitted portion 58 of light beam 30 is reflected, as described above, to fine tracker camera 41 which is coupled to embedded processor 39. In turn, embedded processor 39 is coupled to gimbaled mirror system 28 to control movement of mirror 32 supported by gimbal 34 and is coupled to fast steering mirror 54 to control movement of fast steering mirror 54.

With aircraft 10 flying, collecting data regarding aero-optic disturbances in flow field 12 of aircraft 10 step is commenced. Wavefront sensor lens array 74 and wavefront sensor camera 76 measure aero-optical disturbance data from other portion 60 of light beam 30. Another embedded processor 79 coupled to wavefront sensor lens array 74 and wavefront sensor camera 76, receives the measured aero-optical disturbance data and stores that data. As mentioned earlier, another embedded processor 78 is also coupled to aircraft 10 and receives navigational information regarding the aircraft 10 location, altitude and ground speed as well.

Typically, prior to aircraft 10 taking off to measure and acquire aero-optical disturbance data, a light emitting source is selected, such as star 114 in this example, which has sufficient visible magnitude to operate with measurement system 24. The coordinates for the light emitting source or star 114 are placed into the embedded processor 39 that is coupled to fine tracker camera 41. This enables mirror 32 supported by gimbal 34 to search and detect light emitting source or star 114 with aircraft 10 in flight.

After engines are started, the crew of aircraft 10 initializes system 24 and initializes inertial guidance system from the GPS of aircraft 10. Aircraft 10 proceeds to take off and heads for an initial point for measuring and data acquisition. In this embodiment. set forth in FIGS. 8A-8D, aircraft 10 attains a speed of 1.6 Mach at an altitude of thirty thousand feet (30,000 ft.) with a level flight path 116. The crew initiates a data collection command which initiates gimbal 34, fast steering mirror 54, tracker camera 41 and embedded processor 39. The preloaded target coordinates provide guidance to the initiated devices to acquire the preloaded coordinates for the light emitting source or star 114. With light emitting source or star 114 having light beam 30 engaged to mirror 32 supported by gimbal 34, fine tracker camera sensor 41 sensing light beam 30 centered in the image field, with low bandwidth communication loops closed for gimbal 34 and fast steering mirror 54 with embedded processor 39, measurement system 24 is prepared to enter measurement and acquisition mode with respect to aero-optical disturbances within air flow field 12.

In FIG. 8A, aircraft 10 has attained altitude, speed, flight path and light emitting source or star 114. Flight path 116 is straight and level. Tracker 41 detects sufficient signal obtained from transmitted portion 58 of light beam 30 from star 114, crew can close high bandwidth loop on fast steering mirror 54 and embedded processor 79 initiates collecting the measured data from wavefront lens array 74 and camera 76 measuring the aero-optical disturbance from reflected portion 60 of light beam 30. The high bandwidth loop on fast steering mirror 54 remains in this mode during measurement and data acquisition of measurement system 24 so as to mitigate jitter affects that may be imparted to system 24 during such high speed travel of aircraft 10. During this process, when tracker 41 detects movement of transmitted portion 58 of light beam 30 and sends that data to embedded processor 39 which, in turn, sends commands to fast steering mirror 54 to move. In the embodiment seen in FIG. 8A, star 114 appears at a twenty degree (20°) elevation from aircraft 10 and seventy degrees (70°) off of left hand side of nose 120 of aircraft 10. Star 114 is up and forward in measurement system 24 field of regard.

In FIG. 8B, at ten seconds into the data measuring and acquisition commencement, the next step, in this embodiment, includes aircraft 10 initiating moving its direction of flight or initiating a maneuver. The maneuver is a forty degree (40°) bank turn at 1.6 Mach. This maneuver moves star 114 down and aft in the field of regard for measurement system 24 and aircraft 10 toward a second flight path (not shown). This maneuver moves light emitting source or star 114 in gimbal 34 supported mirror 32 field of regard. Gyro sensor 38 sends movement data of mirror 32 to embedded processor 39. Embedded processor 39 sends commands to gimbal 34 to move mirror 32 keeping light beam 30 aligned with mirror 32 or in the proper field of regard for mirror 32. At the same time, other reflected portion 60 of light beam 30 continues to enter wavefront lens array sensor 74 and wavefront sensor camera 76 thereby measuring aero-optical disturbances from reflected portion 60 of light beam 30. These measurements are stored in embedded processor 78.

In this embodiment, at fifty seconds (50 secs.) after commencing measuring and acquiring data with respect to aero-optical disturbances, aircraft 10 rolls to level in FIG. 8C and commences flying in a second flight path. At this point, aircraft 10 is still traveling at 1.6 Mach at a straight and level configuration with star 114 at twenty degrees (20°) elevation from aircraft 10 and one hundred degrees (100°) off of left hand sector of nose 120. Star 114 is up and aft in field of regard for measuring system 24. In this step of flying aircraft 10 in the second flight path, wavefront lens array sensor 74 and wavefront sensor camera 76 continue to receive reflected portion 60 of light beam 30 in order to measure aero-optical disturbance created by aircraft 10 in air flow field 12.

In referring to FIG. 8D, at sixty seconds (60 secs.) from the time measuring was initiated, aircraft 10 takes the next step of moving from the second flight path with a ten degree (10°) bank turn moving aircraft 10 back to flight path 116. This maneuver moves star 114 up in measuring system 24 field of regard and moves forward in measuring system 24 field of regard. Communication loop of gyro sensor 38, embedded processor 39 and gimbal 34 maintain star 114 image and light beam 30 aligned with field of regard for mirror 32. Gyro sensor 38 senses movement and sends that data to embedded processor 39. Embedded processor in return sends control commands to gimbal 34 to move mirror 32 and maintain star 114 in the field of regard of mirror 32. During this step with moving aircraft 10 back to flight path 116 reflected portion 60 of light beam 30 continues to be received by wavefront lens array sensor 74 and wavefront camera 76 so as to continue to measure the aero-optical disturbance in air flow field 12. The measurement data continues to be stored by embedded processor 78.

At the completion of the maneuver by aircraft 10, the crew shuts off the high bandwidth communication loop of fast steering mirror 54 causing measurement data collection from embedded processor 78 to automatically stop. Communications from embedded processor 39 to gimbal 34 and fine tracker camera 41 are also disabled. The crew then flies aircraft 10 to its next measurement and acquisition initial or commencement point and the process is repeated. Once all of the data is measured and collected by system 24, for that particular flight mission, the ground crew off loads the data that was stored in embedded processor 78. These flight missions are carried out until sufficient data has been measured and acquired for aero-optical disturbances in air flow field 12 for each type of aircraft 10 at various speeds, altitudes and flight maneuvering configurations.

The collecting of aero-optical disturbance data in air flow field 12 of aircraft 10 was described above in FIGS. 8A-8D with using a star 114 as the light emitting source for light beam 30. Similarly, such measurement data of aero-optical disturbances is collected in FIGS. 9A-9D with the light emitting source being a beacon on another aircraft 122 emitting light beam 30. In FIG. 9A, in this embodiment, aircraft 10 is in its first flight path 116 traveling at 1.6 Mach at an altitude of thirty thousand feet (30,000 feet) in straight and level flight. Light beam 30 from other aircraft 122 is tracked and maintained in measurement system 24 field of regard much like the flight associated with star 114. Aero-optical disturbances are measured and stored along with the operational data from aircraft 10 by other embedded processer 78. With light emitting source acquired, measuring of aero-optical disturbances proceed, in this embodiment, for fifteen seconds (15 secs.). The light emitting source on other aircraft 122 is positioned at forty five degrees (45°) elevation from aircraft 10 and forty five degrees (45°) off the left hand side of nose 120 of aircraft 10. The target light emitting source on other aircraft 122 is up and forward in measuring system 24 field of regard 112.

In referring to FIG. 9B, aircraft 10 commences moving or initiating a bank turn. At about twenty seconds (20 secs.) from initially engaging light emitting source, aircraft 10 continues to fly at 1.6 Mach and makes a bank turn of forty degrees (40°). Target light emitting source is at forty eight degrees (48°) elevation from aircraft 10 and fifty four (54°) off nose 120 and moving aft. This bank moves target light emitting source down and aft in measurement system 24 field of regard. Again, measurement and acquisition of aero-optical disturbance data continues as does maintaining the target light emitting source in the field of regard of measurement system 24. Throughout the data measuring and acquisition, mitigating jitter is accomplished through the high speed closed communication loop of the fast steering mirror 54 and embedded processor 39.

In referring to FIG. 9C, at thirty seconds (30 secs.) after initial engagement with beacon, aircraft 10 remains at 1.6 Mach and on a straight and level second flight path. Target light emitting source on other aircraft 122 is at one hundred degrees (100°) off of left side of nose 120 of aircraft 10 and target beacon is up and aft in measurement system 24 field of regard 112. Again, measurement and acquisition of this data continues through reflected portion 60 of light beam 30 from target light emitting source of other aircraft 122 passing through wavefront lens array 74 and wavefront camera 76 and being stored on other processor 78.

In FIG. 9D, aircraft 10 has overcome other aircraft 122 at thirty nine seconds (39 secs.) after initial engagement with target light emitting source. Aircraft 10 is still traveling at 1.6 Mach and makes a ten degree (10°) bank turn. Target light emitting source on other aircraft 122 is forty four degrees (44°) up and one hundred and thirty six degrees (136°) aft from aircraft 10. Aircraft 10 has moved target light emitting source up in measurement system 24 field of regard 112. Target light emitting source continues to move aft until out of measurement system 24 field of regard 112. Data measuring stops when pilot turns off measuring system 24. Again, the data stored by other processor 78 is off-loaded by the ground crew once aircraft 10 returns to base.

As mentioned earlier, data measuring and collecting missions will, in this embodiment, be run in a range of speeds of at least up to Mach 2, altitudes of sea level to seventy-five thousand (75,000 feet) and with maneuvers up to 3 g. The measured and acquired data for airflow field 12 aero-optical disturbances for each aircraft will provide custom modeling for the optical equipment to be later carried by such aircraft. Incorporation of the spatial and temporal data measured by system 24 will enable designs of the optical equipment to effectively compensate for and operate through the aero-optical disturbances created in flow fields 12 of aircraft 10.

While various embodiments have been described above, this disclosure is not intended to be limited thereto. Variations can be made to the disclosed embodiments that are still within the scope of the appended claims.

What is claimed:

1. An aero-optical disturbance measurement system, comprising:
    a mirror supported by a gimbal for receiving a light beam from a light emitting source and reflecting the light beam emitted from the light emitting source to a first periscope fold mirror;
    a second periscope fold mirror positioned to receive the light beam reflected directly from the first periscope fold mirror;
    a first concave off-axis paraboloid mirror positioned to receive the light beam reflected from the second periscope fold mirror;
    a first fold mirror positioned to receive the light beam reflected directly from the first concave off-axis paraboloid mirror;
    a second fold mirror positioned to receive the light beam reflected directly from the first fold mirror;
    a second concave off-axis paraboloid mirror positioned to receive the light beam reflected directly from the second fold mirror and reflecting the light beam to a fast steering mirror; and
    a fine tracker camera coupled to an embedded processer wherein:
        the fine tracker camera receives a transmitted portion of the light beam from the fast steering mirror;
        the embedded processor is coupled to the fast steering mirror such that the embedded processor controls movement of the fast steering mirror; and
        the embedded processor is coupled to the gimbal and controls the movement of the mirror supported by the gimbal.

2. The aero-optical disturbance measurement system of claim 1, further including a gyro sensor coupled to the mirror supported by the gimbal so as to sense mirror motion wherein the gyro sensor is coupled to communicate movement of the mirror supported by the gimbal to the embedded processor.

3. The aero-optical disturbance measurement system of claim 2, wherein:
    the mirror supported by the gimbal is positioned behind a window of an aircraft through which the light beam from the light emitting source passes; and
    the window is positioned at different locations on the aircraft comprising at least one of a side nose barrel, a dorsal mid-body, a wing gun location, an electro-optical targeting system location, a conformal fairing, an upper nose barrel and a dorsal behind cockpit.

4. The aero-optical disturbance measurement system of claim 1, wherein the angle of incidence of the light beam with the first periscope fold mirror is approximately 45 degrees.

5. The aero-optical disturbance measurement system of claim 1, further including a first intermediate mirror fold mirror positioned to receive the beam of light reflected directly from the second periscope fold mirror with an angle of incidence of approximately 45 degrees and reflects the beam directly to a second intermediate fold mirror which receives the beam of light at approximately 45 degrees of incidence.

6. The aero-optical disturbance measurement system of claim 5, wherein the first concave off-axis paraboloid mirror receives the light beam directly reflected from the second intermediate fold mirror.

7. The aero-optical disturbance measurement system claim 6, wherein a first fold mirror receives the beam of light reflected directly from the first concave off-axis paraboloid mirror and reflects the beam of light directly to a second fold mirror.

8. The aero-optical disturbance measurement system of claim 7, wherein a second concave off-axis paraboloid mirror receives the light beam reflected directly from the second fold mirror.

9. The aero-optical disturbance measurement system of claim 1, wherein the fast steering mirror operates with an angular stroke length within a range of +1.5 degrees and −1.5 degrees and angular resolution of <2 microradian commanded byte embedded processor with a control bandwidth of 100 Hz to 1000 Hz.

10. The aero-optical disturbance measurement system of claim 1, further including a beam splitter which receives the light beam reflected directly from the fast steering mirror wherein the beam splitter splits the light beam into the transmitted portion and a reflected portion.

11. The aero-optical disturbance measurement system of claim 10, further including a first tracker fold mirror receiving the transmitted portion from the beam splitter and an achromatic lens receives the transmitted portion of the light beam directly from the first tracker fold mirror and transmits the transmitted portion to the second tracker fold mirror.

12. The aero-optical disturbance measurement system of claim 11, wherein the fine tracker camera receives the transmitted portion reflected directly from the second tracker fold mirror.

13. The aero-optical disturbance measurement system of claim 12, further including a filter wheel assembly positioned between the second tracker fold mirror and the fine tracker camera.

14. The aero-optical disturbance measurement system of claim 10, further including a first wavefront sensor fold mirror receiving the reflected portion directly from the beam splitter and directly reflecting the reflected portion to an achromatic pupil relay.

15. The aero-optical disturbance measurement system of claim 14, further including a wavefront sensor comprising a lenslet array positioned to receive the reflected portion directly from the achromatic pupil relay and focusing the reflected portion to a focal plane array camera.

16. The aero-optical disturbance measurement system of claim 15, wherein the array comprises a set of lenslets of at least 16 by 16.

17. The aero-optical disturbance measurement system of claim 15, wherein the array comprises a set of lenslets of 24 by 24.

18. The aero-optical disturbance measurement system of claim 15, further including another embedded processor coupled to the wavefront sensor which collects data from the wavefront sensor and navigational data generated by an aircraft in which the disturbance measurement system containing the wavefront sensor is configured to conformally mount to the aircraft.

19. The aero-optical disturbance measurement system of claim 15, wherein with the aero-optical disturbance measurement system configured to conformally mount to an aircraft moving at a supersonic speed on a flight path with the light beam received by the mirror supported by the gimbal in a field of regard for the mirror supported by the gimbal, the tracker camera receives the transmitted portion of the light beam and the wavefront sensor receives the reflected portion of the light beam.

20. The aero-optical disturbance measurement system of claim 19, wherein with the aircraft moving away from the flight path, the light beam moves in the field of regard of the mirror supported by the gimbal and the embedded processor provides control commands to the gimbal to move the mirror supported by the gimbal and the wavefront sensor receives the reflected portion.

21. The aero-optical disturbance measurement system of claim 20, wherein with the aircraft moving in a second flight path, the wavefront sensor receives the reflected portion.

22. The aero-optical disturbance measurement system of claim 21, wherein with the aircraft moving to the flight path, the light beam moves within the field of regard for the mirror supported by the gimbal and the gyro sensor communicates that move to the embedded processor, and the embedded processor provides control commands to the gimbal to move the mirror supported by the gimbal and the wavefront sensor receives data from the reflected portion.

23. The aero-optical disturbance measurement system of claim 19, wherein a gyro sensor coupled to the mirror supported by the gimbal and to the embedded processor conveys information to the embedded processor regarding movement of the mirror supported by the gimbal and the embedded processor provides movement commands to the gimbal to move the mirror supported by the gimbal.

24. The aero-optical disturbance measurement system of claim 19, further including the fine tracker camera detects movement of the transmitted portion and the embedded processor sends a command to the fast steering mirror to move the fast steering mirror.

25. The aero-optical disturbance measurement system of claim 1, wherein the embedded processor is coupled to the gimbal with a control bandwidth of 10 Hz to 100 Hz.

26. The aero-optical disturbance measurement system of claim 1, wherein the gimbal operates with an angular sensing of <4 microradians in resolution over a field of regard of +/−45 deg in azimuth and elevation, and a maximum angular rate of >60 deg/sec in azimuth and elevation.

27. An aero-optical disturbance measurement system, comprising:
a mirror supported by a gimbal for receiving a light beam from a light emitting source and reflecting the light beam emitted from the light emitting source to a first periscope fold mirror;
a second periscope fold mirror positioned to receive the light beam reflected directly from the first periscope fold mirror;
a first concave off-axis paraboloid mirror positioned to receive the light beam reflected from the second periscope fold mirror;
a first fold mirror positioned to receive the light beam reflected directly from the first concave off-axis paraboloid mirror;
a second fold mirror positioned to receive the light beam reflected directly from the first fold mirror;
a second concave off-axis paraboloid mirror positioned to receive the light beam reflected directly from the second fold mirror and reflecting the light beam to a fast steering mirror; and a beam splitter which receives the light beam reflected directly from the fast steering mirror wherein the beam splitter splits the light beam into a transmitted portion and a reflected portion.

28. The aero-optical disturbance measurement system of claim 27, wherein the angle of incidence of the light beam with the first periscope fold mirror is approximately 45 degrees.

29. The aero-optical disturbance measurement system of claim 27, further including a first intermediate mirror fold mirror positioned to receive the beam of light reflected directly from the second periscope fold mirror with an angle of incidence of approximately 45 degrees and reflects the beam directly to a second intermediate fold mirror which receives the beam of light at approximately 45 degrees of incidence.

30. The aero-optical disturbance measurement system of claim 29, wherein the first concave off-axis paraboloid mirror receives the light beam directly reflected from the second intermediate fold mirror.

31. The aero-optical disturbance measurement system claim 30, wherein a first fold mirror receives the beam of light reflected directly from the first concave off-axis paraboloid mirror and reflects the beam of light directly to a second fold mirror.

32. The aero-optical disturbance measurement system of claim 31, wherein a second concave off-axis paraboloid mirror receives the light beam reflected directly from the second fold mirror.

33. The aero-optical disturbance measurement system of claim 27, further including a fine tracker camera coupled to an embedded processer wherein:
the fine tracker camera receives the transmitted portion of the light beam from the fast steering mirror;
the embedded processor is coupled to the fast steering mirror such that the embedded processor controls movement of the fast steering mirror; and
the embedded processor is coupled to the gimbal and controls the movement of the mirror supported by the gimbal.

34. The aero-optical disturbance measurement system of claim 33, further including a gyro sensor coupled to the mirror supported by the gimbal so as to sense mirror motion wherein the gyro sensor is coupled to communicate movement of the mirror supported by the gimbal to the embedded processor.

35. The aero-optical disturbance measurement system of claim 34, wherein:
the mirror supported by the gimbal is positioned behind a window of an aircraft through which the light beam from the light emitting source passes; and the window is positioned at different locations on the aircraft comprising at least one of a side nose barrel, a dorsal mid-body, a wing gun location, an electro-optical targeting system location, a conformal fairing, an upper nose barrel and a dorsal behind cockpit.

36. The aero-optical disturbance measurement system of claim 33, wherein the fast steering mirror operates with an angular stroke length within a range of +1.5 degrees and −1.5 degrees and angular resolution of <2 microradian commanded byte embedded processor with a control bandwidth of 100 Hz to 1000 Hz.

37. The aero-optical disturbance measurement system of claim 33, further including a first tracker fold mirror receiving the transmitted portion from the beam splitter and an achromatic lens receives the transmitted portion of the light beam directly from the first tracker fold mirror and transmits the transmitted portion to a second tracker fold mirror.

38. The aero-optical disturbance measurement system of claim 37, wherein the fine tracker camera receives the transmitted portion reflected directly from the second tracker fold mirror.

39. The aero-optical disturbance measurement system of claim 38, further including a filter wheel assembly positioned between the second tracker fold mirror and the fine tracker camera.

40. The aero-optical disturbance measurement system of claim 33, wherein the embedded processor is coupled to the gimbal with a control bandwidth of 10 Hz to 100 Hz.

41. The aero-optical disturbance measurement system of claim 40, wherein the gimbal operates with an angular sensing of <4 microradians in resolution over a field of regard of +/−45 deg in azimuth and elevation, and a maximum angular rate of >60 deg/sec in azimuth and elevation.

42. The aero-optical disturbance measurement system of claim 27, further including a first wavefront sensor fold mirror receiving the reflected portion directly from the beam splitter and directly reflecting the reflected portion to an achromatic pupil relay.

43. The aero-optical disturbance measurement system of claim 42, further including a wavefront sensor comprising a lenslet array positioned to receive the reflected portion directly from the achromatic pupil relay and focusing the reflected portion to a focal plane array camera.

44. The aero-optical disturbance measurement system of claim 43, further including:
another embedded processor coupled to the wavefront sensor which collects data from the wavefront sensor and navigational data generated by an aircraft; and
the disturbance measurement system containing the wavefront sensor is configured to conformally mount to the aircraft.

45. The aero-optical disturbance measurement system of claim 43, wherein the array comprises a set of lenslets of at least 16 by 16.

46. An aero-optical disturbance measurement system, comprising:
a mirror supported by a gimbal for receiving a light beam from a light emitting source and reflecting the light beam emitted from the light emitting source to a fast steering mirror;
a beam splitter which receives the light beam reflected directly from the fast steering mirror wherein the beam splitter splits the light beam into a transmitted portion and a reflected portion; and
a fine tracker camera coupled to an embedded processer wherein:
the fine tracker camera receives the transmitted portion of the light beam from the fast steering mirror;
the embedded processor is coupled to the fast steering mirror such that the embedded processor controls movement of the fast steering mirror; and
the embedded processor is coupled to the gimbal and controls the movement of the mirror supported by the gimbal.

47. The aero-optical disturbance measurement system of claim 46, further includes:
a first periscope fold mirror receiving the light beam source directly from the mirror supported by the gimbal;
a second periscope fold mirror positioned to receive the light beam reflected directly from the first periscope fold mirror;

a first concave off-axis paraboloid mirror positioned to receive the light beam reflected from the second periscope fold mirror;

a first fold mirror positioned to receive the light beam reflected directly from the first concave off-axis paraboloid mirror;

a second fold mirror positioned to receive the light beam reflected directly from the first fold mirror; and a second concave off-axis paraboloid mirror positioned to receive the light beam reflected directly from the second fold mirror and reflecting the light beam to the fast steering mirror.

48. The aero-optical disturbance measurement system of claim 47, wherein the angle of incidence of the light beam with the first periscope fold mirror is approximately 45 degrees.

49. The aero-optical disturbance measurement system of claim 47, further including a first intermediate mirror fold mirror positioned to receive the beam of light reflected directly from the second periscope fold mirror with an angle of incidence of approximately 45 degrees and reflects the beam directly to a second intermediate fold mirror which receives the beam of light at approximately 45 degrees of incidence.

50. The aero-optical disturbance measurement system of claim 49, wherein the first concave off-axis paraboloid mirror receives the light beam directly reflected from the second intermediate fold mirror.

51. The aero-optical disturbance measurement system claim 50 wherein a first fold mirror receives the beam of light reflected directly from the first concave off-axis paraboloid mirror and reflects the beam of light directly to a second fold mirror.

52. The aero-optical disturbance measurement system of claim 51 wherein a second concave off-axis paraboloid mirror receives the light beam reflected directly from the second fold mirror.

53. The aero-optical disturbance measurement system of claim 46 wherein the fast steering mirror operates with an angular stroke length within a range of +1.5 degrees and −1.5 degrees and angular resolution of <2 microradian commanded byte embedded processor with a control bandwidth of 100 Hz to 1000 Hz.

54. The aero-optical disturbance measurement system of claim 46, further including a first tracker fold mirror receiving the transmitted portion from the beam splitter, an achromatic lens which receives the transmitted portion of the light beam directly from the first tracker fold mirror to a second tracker fold mirror.

55. The aero-optical disturbance measurement system of claim 54, wherein the fine tracker camera receives the transmitted portion reflected directly from the second tracker fold mirror.

56. The aero-optical disturbance measurement system of claim 55, further including a filter wheel assembly positioned between the second tracker fold mirror and the fine tracker camera.

57. The aero-optical disturbance measurement system of claim 46, further including a gyro sensor coupled to the mirror supported by the gimbal so as to sense mirror motion, wherein the gyro sensor is coupled to communicate movement of the mirror supported by the gimbal to the embedded processor.

58. The aero-optical disturbance measurement system of claim 46, wherein:

the mirror supported by the gimbal is positioned behind a window of an aircraft through which the light beam from the light emitting source passes; and the window is positioned at different locations on the aircraft comprising at least one of a side nose barrel, a dorsal mid-body, a wing gun location, an electro-optical targeting system location, a conformal fairing, an upper nose barrel and a dorsal behind cockpit.

59. The aero-optical disturbance measurement system of claim 46, wherein the embedded processor is coupled to the gimbal with a control bandwidth of 10 Hz to 100 Hz.

60. The aero-optical disturbance measurement system of claim 46, wherein the gimbal operates with an angular sensing of <4 microradians in resolution over a field of regard of +/−45 deg in azimuth and elevation, and a maximum angular rate of >60 deg/sec in azimuth and elevation.

61. The aero-optical disturbance measurement system of claim 46, further including a first wavefront sensor fold mirror receiving the reflected portion directly from the beam splitter and directly reflecting the reflected portion to an achromatic pupil relay.

62. The aero-optical disturbance measurement system of claim 61, further including a wavefront sensor comprising a lenslet array positioned to receive the reflected portion directly from the achromatic pupil relay and focusing the reflected portion to a focal plane array camera.

63. The aero-optical disturbance measurement system of claim 62, further including:

another embedded processor coupled to the wavefront sensor which collects data from the wavefront sensor and navigational data generated by an aircraft; and the disturbance measurement system containing the wavefront sensor is configured to conformally mount to an aircraft.

64. The aero-optical disturbance measurement system of claim 62, wherein the array comprises a set of lenslets of at least 16 by 16.

* * * * *

UNITED STATES PATENT AND TRADEMARK OFFICE
CERTIFICATE OF CORRECTION

PATENT NO. : 10,057,468 B2
APPLICATION NO. : 14/501854
DATED : August 21, 2018
INVENTOR(S) : Bryan Lee Kelchner et al.

Page 1 of 1

It is certified that error appears in the above-identified patent and that said Letters Patent is hereby corrected as shown below:

In the Claims

At Column 17, Lines 9-10, "system claim" should be -- system of claim --.

At Column 19, Lines 22-23, "system claim" should be -- system of claim --.

At Column 21, Lines 28-29, "system claim" should be -- system of claim --.

Signed and Sealed this
Twenty-fifth Day of December, 2018

Andrei Iancu
*Director of the United States Patent and Trademark Office*